(12) United States Patent
Pickard

(10) Patent No.: US 12,482,167 B2
(45) Date of Patent: Nov. 25, 2025

(54) TEXTURE MAPPING TO POLYGONAL MODELS FOR INDUSTRIAL INSPECTIONS

(71) Applicant: EIGEN INNOVATIONS INC., Fredericton (CA)

(72) Inventor: Joshua Pickard, Fredericton (CA)

(73) Assignee: EIGEN INNOVATIONS, Fredricton (CA)

( * ) Notice: Subject to any disclaimer, the term of this patent is extended or adjusted under 35 U.S.C. 154(b) by 185 days.

(21) Appl. No.: 18/562,687

(22) PCT Filed: May 20, 2022

(86) PCT No.: PCT/CA2022/050815
§ 371 (c)(1),
(2) Date: Nov. 20, 2023

(87) PCT Pub. No.: WO2022/241574
PCT Pub. Date: Nov. 24, 2022

(65) Prior Publication Data
US 2024/0265616 A1    Aug. 8, 2024

Related U.S. Application Data

(60) Provisional application No. 63/191,167, filed on May 20, 2021.

(51) Int. Cl.
*G06T 15/04*     (2011.01)
*G06T 7/13*     (2017.01)
(Continued)

(52) U.S. Cl.
CPC .............. *G06T 15/04* (2013.01); *G06T 7/13* (2017.01); *G06T 7/70* (2017.01); *G06T 15/60* (2013.01); *G06V 10/764* (2022.01)

(58) Field of Classification Search
CPC .. G06T 15/04; G06T 7/13; G06T 7/70; G06T 15/60; G06V 10/764
See application file for complete search history.

(56) References Cited

U.S. PATENT DOCUMENTS

| | | | |
|---|---|---|---|
| 7,706,601 B2 * | 4/2010 | Hamanaka | ........... G06V 40/161 |
| | | | 382/209 |
| 8,217,961 B2 * | 7/2012 | Chang | ....................... G06T 7/75 |
| | | | 345/619 |

(Continued)

FOREIGN PATENT DOCUMENTS

| | | |
|---|---|---|
| EP | 3032495 A1 | 6/2016 |
| EP | 3226208 A1 | 10/2017 |
| WO | 2001067749 A2 | 9/2001 |

OTHER PUBLICATIONS

Debevec, Paul E. et al: "Modeling and Rendering Architecture From Photographs: A hybrid heometry-and image-based approach", Computer Graphics Proceedings 1996 (Siggraph). New Orleans, Aug. 4-9, 1996; [Computer Graphics Proceedings(Siggraph)], New York, NY : Acm, US, Aug. 4, 1996 (Aug. 4, 1996), pp. 11-20.

(Continued)

*Primary Examiner* — Xin Sheng

(57) ABSTRACT

System and method that includes: capturing an image of a manufactured part using an image sensing device, wherein an actual pose of the manufactured part relative to the image sensing device in the image can vary from an expected pose of the manufactured part relative to the image sensing device; estimating an optimal pose that represents a transformation of the expected pose to the actual pose based on (i) the image, (ii) initial pose data that indicates the expected pose, and (iii) a 3D model that models a model part that corresponds to the manufactured part as a set of polygonal facets; mapping texture data from the image to facets of the 3D model based on the optimal pose to generate a textured (Continued)

3D model corresponding to the optimal pose; and rendering a virtual image for a further pose of the manufactured part based on the textured 3D model.

19 Claims, 15 Drawing Sheets

(51) Int. Cl.
*G06T 7/70* (2017.01)
*G06T 15/60* (2006.01)
*G06V 10/764* (2022.01)

(56) References Cited

U.S. PATENT DOCUMENTS

| | | | |
|---|---|---|---|
| 8,970,690 B2* | 3/2015 | Meier | G06T 15/00 |
| | | | 345/158 |
| 9,305,390 B2 | 4/2016 | Schlichte et al. | |
| 10,776,949 B2* | 9/2020 | Haven | G06T 7/74 |
| 10,779,949 B2 | 9/2020 | Haven et al. | |
| 2001/0043738 A1* | 11/2001 | Sawhney | G06T 15/20 |
| | | | 382/154 |
| 2003/0001837 A1 | 1/2003 | Baumberg | |
| 2014/0354632 A1 | 12/2014 | Alj | |
| 2018/0211373 A1 | 7/2018 | Stoppa et al. | |
| 2019/0178643 A1 | 6/2019 | Metzler et al. | |
| 2020/0372625 A1 | 11/2020 | Dal Mutto et al. | |

OTHER PUBLICATIONS

Pintus, Ruggero et al: "Techniques for Seamless Color Registration and Mapping on Dense 3D Models", In: "Sensing the Past", Jan. 1, 2017 (Jan. 1, 2017), Springer International Publishing, Cham.

Weinhaus, Fredrick M. et al: "Texture Mapping 3D Models of Real-World Scenes", ACM Computing Surveys (CSUR), Association for Computing Machinery, vol. 29, No. 4, Dec. 1, 1997 (Dec. 1, 1997), pp. 325-365.

* cited by examiner

Image 202

Detect Edges
211

Projected Edge Image
212

Rendered Image 1504

Rendered Image 1502

TEXTURE MAPPING TO POLYGONAL MODELS FOR INDUSTRIAL INSPECTIONS

RELATED APPLICATIONS

This application claims priority to and benefit of U.S. Provisional Patent Application No. 63/191,167, filed May 20, 2021, the contents of which are incorporated herein by reference.

FIELD

This disclosure relates generally to imaging systems applied to industrial inspections.

BACKGROUND

The cost of quality for industrial manufacturing, particularly costs associated with inspection and prevention, can negatively impact profitability. Highly automated, high volume industrial processes require extensive amounts of information to be captured and analyzed. In this regard, industrial imaging systems, including one or more of thermal imaging systems (e.g., near-infrared (NIR) and infrared (IR) systems), optical imaging systems (e.g., Red-Green-Blue (RGB), and Hue-Intensity-Saturation (HIS), and monochrome imaging systems), hyperspectral imaging systems (HSI), and other electromagnetic (EM) wave detection based imaging systems, can be used to capture information about an industrial process for inspection and/or control purposes, and combined with machine learning systems that aid in the analysis and processing of such information.

An intelligent system to detect non-trivial part defects requires the use of advanced machine learning-based algorithms that are trained to detect specific defects and/or anomalous data. For these systems, common issues such as part pose variation, image sensor pose variation, and background variation can significantly impact the reliability of these algorithms. These issues introduce unwanted variability into the dataset and therefore, to improve algorithm reliability, large training datasets are required. This quickly becomes undesirable for industrial applications, where the production of defective parts is generally avoided and rapid deployment of defect detection solutions is desired.

Accordingly, there is a need to extract information from the data produced by an imaging system in a manner that can transform and normalize such data both for direct real-time application as well as for training purposes.

SUMMARY

According to an example aspect, a computer implemented method and system is described that includes: estimating an optimal pose for a manufactured part for virtual image rendering based on: an image of the manufactured part, initial pose data about an image sensing device that generated the image, and a 3D model that models the part as a set of polygonal facets; mapping texture data from the image to the facets based on the optimal pose; and rendering a virtual image for a novel pose based on the 3D model and the mapped texture data.

According to example implementations is a system and method that includes: capturing an image of a manufactured part using an image sensing device, wherein an actual pose of the manufactured part relative to the image sensing device in the image can vary from an expected pose of the manufactured part relative to the image sensing device; estimating an optimal pose that represents a transformation of the expected pose to the actual pose based on (i) the image, (ii) initial pose data that indicates the expected pose, and (iii) a 3D model that models a model part that corresponds to the manufactured part as a set of polygonal facets; mapping texture data from the image to facets of the 3D model based on the optimal pose to generate a textured 3D model corresponding to the optimal pose; and rendering a virtual image for a further pose of the manufactured part based on the textured 3D model.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

This disclosure presents systems and methods that apply image analysis techniques to improve the performance of inspection and process control tasks related to industrial processes such as manufacturing processes. Many manufacturing processes repeatedly mass-produce specific parts with known geometries (i.e., digital 3D models have been created for the manufactured parts). Typically, a manufactured part will be intended to have an expected pose (i.e., a known 3D position and 3D orientation) with respect to an image sensing device (e.g., a camera) at the time that an image of the part is captured by the image sensing device. However, the actual pose of the manufactured part can frequently vary from the expected pose. In example embodiments, real image data of a manufactured part can be combined with 3D model data for the part to estimate an optimal pose for the manufactured part. This can enable variability in the part pose to be automatically managed and can also eliminate unwanted data, such as image backgrounds, by mapping the captured object images as textures onto the 3D model. Texture mapping involves mapping image textures of a physical part, captured by various types of imaging sensors (e.g., color, monochrome, near-infrared, infrared, and hyperspectral image sensor devices), onto the surface of a corresponding 3D model. This connects the image pixel data to spatial 3D model data and allows for various virtual viewpoints of the part, as seen from a virtual camera, to be rendered by an arbitrary virtual rendering unit. In at least some applications, this normalizes the image data and better conditions the images for machine learning as the unwanted data variabilities (e.g., part pose and image sensor device pose variations, background variations, etc.) can be removed from the image datasets. In some cases, the manual process of labelling images for training purposes is also simplified since the user is able to compare and label normalized image data. This has been seen to significantly improve labelling times and accuracy. This also improves the performance of anomaly detection algorithms.

Figure 1:
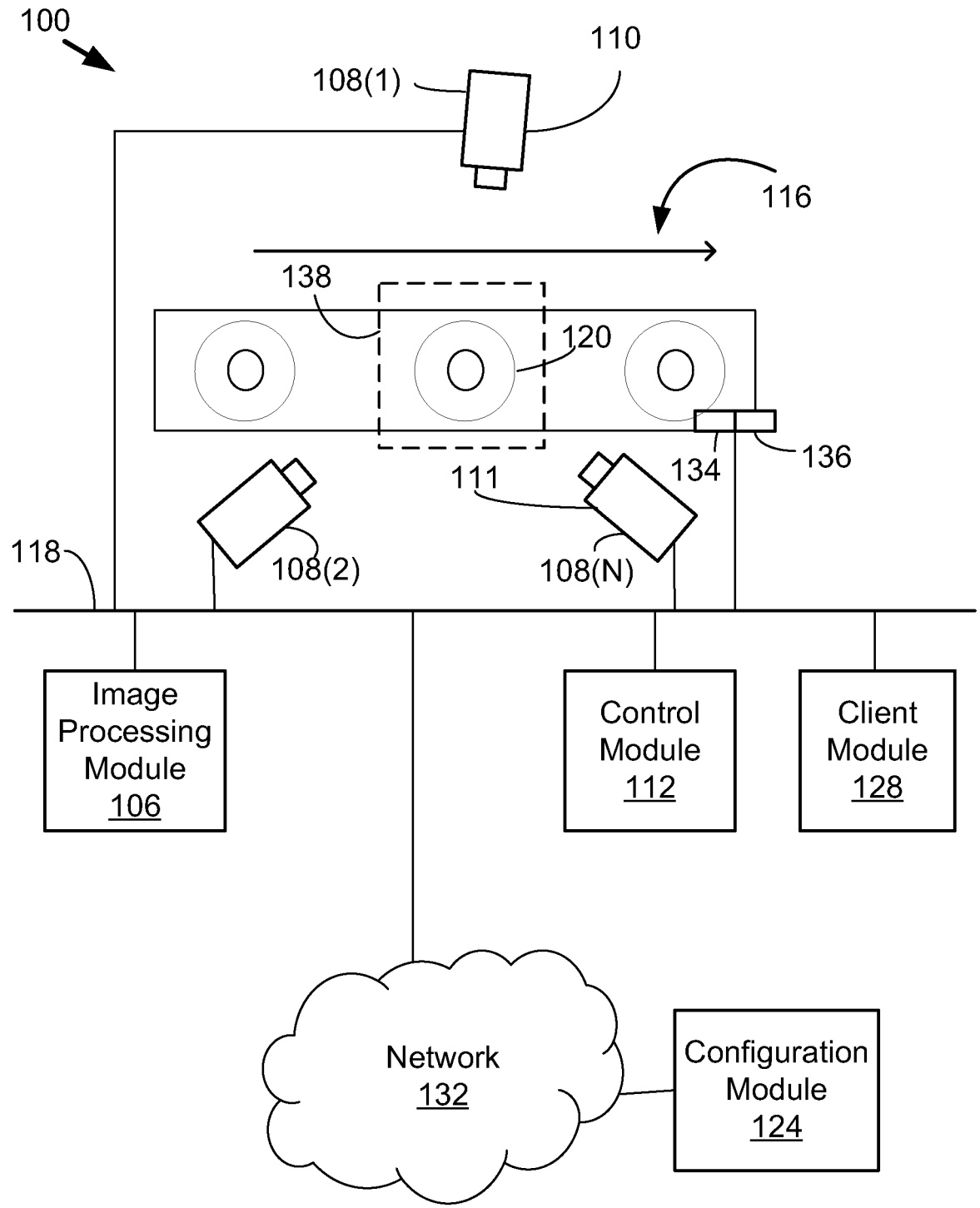
FIG. 1 is a block diagram illustrating a system that includes imaging components according to example embodiments.

FIG. 1 depicts a system 100 that incorporates image analysis for industrial process applications. In example embodiments, the elements of system 100 include one or more image sensor devices 108(1) to 108(N) (reference 108 is used to denote a generic individual image sensor device 108 in this disclosure), image processing module 106, control module 112, configuration module 124 and client module 128. As used here, a "module" and a "unit" can refer to a combination of a hardware processing circuit and machine-readable instructions and data (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

In example embodiments, image sensor devices 108(1) to 108(N), image processing module 106, process control module 112 and client module 128 may be located at an industrial process location or site and enabled to communicate with an enterprise or local communications network 118 that includes wireless links (e.g. a wireless local area network such as WI-FI™ or personal area network such as Bluetooth™), wired links (e.g. Ethernet, universal serial bus, network switching components, and/or routers, or a combination of wireless and wireless communication links. In example embodiments, configuration module 124 may be located at a geographic location remote from the industrial process location and connected to local communications network 118 through a further external network 132 that may include wireless links, wired links, or a combination of wireless and wireless communication links. External network 132 may include the Internet. In some examples, one or more of control module 112, image processing module 106, process control module 112, and client module 128 may alternatively be distributed among one or more geographic locations remote from the industrial process location and connected to the remaining modules through external network 132. In some examples, configuration module 124 may be located at the industrial process location and directly connected to local communications network 118.

In some examples, control module 112, image processing module 106, process control module 112, configuration module 124 and client module 128 may be implemented using a suitably configured processor enabled computer devices or systems such as personal computers, industrial computers, laptop computers, computer servers and programmable logic controllers. In some examples, individual modules may be implemented using a dedicated processor enabled computer device, in some examples multiple modules may be implemented using a common processor enabled computer device, and in some examples the functions of individual modules may be distributed among multiple processor enabled computer devices. Further information regarding example processor enabled computer device configurations will be described below.

In example embodiments, image sensor devices 108(1) to 108(N) can include one or more types of image sensor devices including for example thermal image cameras and optical image cameras. For example, one or more of the image sensor devices 108(1) to 108(N) may be a thermal image camera 111 that is a processor enabled device configured to capture thermal data by measuring emitted infrared (IR) or near infrared (NIR) radiation from a scene and calculate surface temperature of one or more objects of interest within the scene based on the measured radiation. Each thermal image camera 111 can be configured to generate a structured data output in the form of a thermal image that includes a two-dimensional (2D) array (X,Y) of temperature values. The temperature values each represent a respective temperature calculated based on radiation measured from a corresponding point or location of an observed scene. Thus, each thermal image includes spatial information based on the location of temperature values in the elements (referred to as pixels) of the 2D array and temperature information in the form of the temperature value magnitudes. By way of non-limiting example, each thermal image may have a resolution of X=320 by Y=256 pixels that are each assigned a respective calculated temperature value, although other resolutions can alternatively be used. Each thermal image camera 111 may generate several thermal images (also referred to as frames) per second. By way of non-limiting example, each thermal image camera 111 may scan 60 frames per second, with each frame being an X by Y array of temperature values, although other frame rates may also be used. In some examples, the calculated temperature values included in a thermal image may be a floating point temperature value such as a value in degrees Kelvin or Celsius. In some examples, each pixel in a thermal image may map to a desired color palette or include a respective color value (for example an RGB color value) that can be used by a display device to visually represent measured thermal data.

In some examples, one or more of image sensor devices 108(1) to 108(N) can be an optical image camera 110 configured to capture a representation of visible light reflected from a scene that can include one or more objects of interest. Each optical image camera 110 can be configured to generate a structured data output in the form of an optical image that includes two-dimensional (2D) image data arranged as an (X,Y) array of picture elements (e.g., pixels), where each array element represents an optical image data value such as a color value. Each array element may have multiple depths or channels, with each depth representing a respective color value (e.g., Red-Green-Blue (RGB) values in the case of an RGB format, or Hue-Intensity-Saturation (HIS) in the case of an HIS format). In some examples, optical image camera 110 may be a monochrome image sensing device or a grayscale image sensing device. The pixel values included in the optical image data each represent respective visible light properties calculated based on reflected light from a corresponding point or location of an observed scene. Thus, each optical image frame includes geospatial information based on the location of the values in the pixels of the 2D array, and optical data. Each optical image camera 110 may be configured to generate several optical images (also referred to as frames) per second, with each frame being an X by Y array of optical data values.

In example embodiments, image sensor devices 108(1) to 108(N) are arranged to capture a scene that includes at least one component or part 120 (e.g., a manufactured part 120 that is produced as one of a sequence of identical parts in an industrial process 116) such that the images captured by sensor devices 108(1) to 108(N) includes image data about the manufactured part 120.

In example embodiments, image processing module 106 is configured to receive image data from image sensor devices 108(1) to 108(N) about the part 120 in the form of thermal images from one or more thermal image cameras 111, and/or optical images from one or more optical image cameras 110. Each thermal image provides a set of 2D pixel-level thermal texture data for the part 120, and each optical image provides a set of 2D pixel-level optical texture data for the part 120.

As will be explained in greater detail below, image processing module 106 is configured to generate respective mappings of the 2D texture data included in images collected by image sensor devices 108(1) to 108(N) to a 3D model for the part 120. The respective mappings can then be used to generate rendered image data that can represent multiple views, or one or more processed views of the part.

Control module 112 is configured to receive rendered image data from image processing module 106, process the received rendered image data, and take actions based on such processing. In some examples, the actions may include an inspection decision, such as classifying the part 120 as passing or failing a quality standard. In some examples, the actions may include generating control instructions for one or more industrial processes 116 that are part of the system 100. In some examples, the control instructions may include instructing process control unit 136 to physically route a manufactured part 120 based on a classification (e.g., "pass" or "fail" determined for the part 120.

In some examples, control module 112 may include one or more trained machine learning (ML) based models that are configured to perform the processing of the rendered image data.

In some examples, configuration module 124 is configured to receive data, including one or both of texture mapping data and rendered image data, from image processing module 106 and other sources and provide configuration information to control module 112 based on such data. For example, configuration module 124 may be configured to apply learning algorithms based on rendered image data in respect of multiple historic parts 120 to train or update ML based models that can then be deployed to control module 112 for use in a real-time industrial process.

In example embodiments, configuration module 124 may receive data from several image processing modules 106 and use the combined data to generate configuration information for a plurality of image control modules 104.

Client module 128 may be configured to allow users at the industrial process location to interact with the other modules and components of system 100.

The configuration and operation of system 100 will now be described in greater detail in accordance with example embodiments. Although system 100 can be applied to any process in which image data is collected, in an illustrative embodiment the industrial process 116 is an inspection process in which successive identical manufactured parts 120 are automatically inspected for defects as they pass through an inspection station 138. Image sensor devices 108(1) to 108(N) are positioned to capture respective images of part 120 at inspection station 138. In example embodiments, multiple image sensor devices of the same type may be used as (e.g., two thermal image cameras 111, and two optical image cameras 110) as some of the devices may have partially obstructed views of surface region 142. In example embodiments, thermal image cameras 111 may be pre-calibrated to focus on IR emissions from certain regions within a scene and/or within specified magnitude thresholds in order to filter extraneous information from the captured thermal images.

Part 120 may be associated with a unique identifier that enables the part 120 to be tracked through industrial process 116. For example, part 120 could have a unique component identifier (ID) that is applied to a machine readable label (e.g. barcode or RFID tag) that can be read by a process sensor 134. The component ID 146 may also include a model or part identifier and other information. In some examples, the component ID for a part 120 may be assigned and tracked based on the location of the part within a sequence of manufactured parts, rather than as a physical label.

In example embodiments, the location and orientation of each of image sensor devices 108(1) to 108(N) is fixed and known relative to inspection station 138. Industrial process 116 is configured such that the part 120 will have an expected pose relative to each of the image sensor devices 108(1) to 108(N), when the part is present at the inspection station 138. In this disclosure, the expected pose of the part at the time that an image is captured by a respective image sensor device 108 can be referred to as an "initial pose" for that image sensor device 108 and includes 6 dimension spatial data that defines the expected 3-dimensional position and 3-dimensional orientation of the part 120 relative to a reference point of that specific image sensor device 108. For example, the initial pose can include an expected part orientation (e.g. for example pitch, yaw and roll of the part) and location (e.g. X,Y,Z Cartesian location) of a reference point of the manufactured part 120 relative to a reference point of the respective image sensor device 108. In at least some example applications, the actual pose of the part 120 relative to an image sensor device 108 may vary from the expected "initial pose" due to uncertainties and disturbances inherent in the industrial process. As will be described below, image processing module 106 is configured to process image data from each of the image sensor devices 108(1) to 108(N) to mitigate the effects of variations in the actual part pose from the initial pose, as well as for other variations in image data collection that can result from variations in the properties of individual image sensor devices 108. For example, image sensor devices 108 can have varying imaging properties such as focal length, field of view, principle point, lens artifacts (e.g., lens distortion), etc. that can affect collected image data.

The processing of image data from a representative image sensor device 108 in respect of a target part 120 by image processing module 106 will now be described with reference to FIG. 2, which is a block diagram of a pipeline of image processing and rendering operations performed by image processing module 106 according to example embodiments. The processing and rendering operations performed by image processing module 106 can be applied to various types of image data, including for thermal image data and optical image data, and accordingly the operation for image processing module 106 will be described in the context of arbitrary image data in which an image is represented as a matrix of image pixel values corresponding to a scene that includes part 120 and a background (e.g., image data that does not map to a surface of the part).

Figure 2:
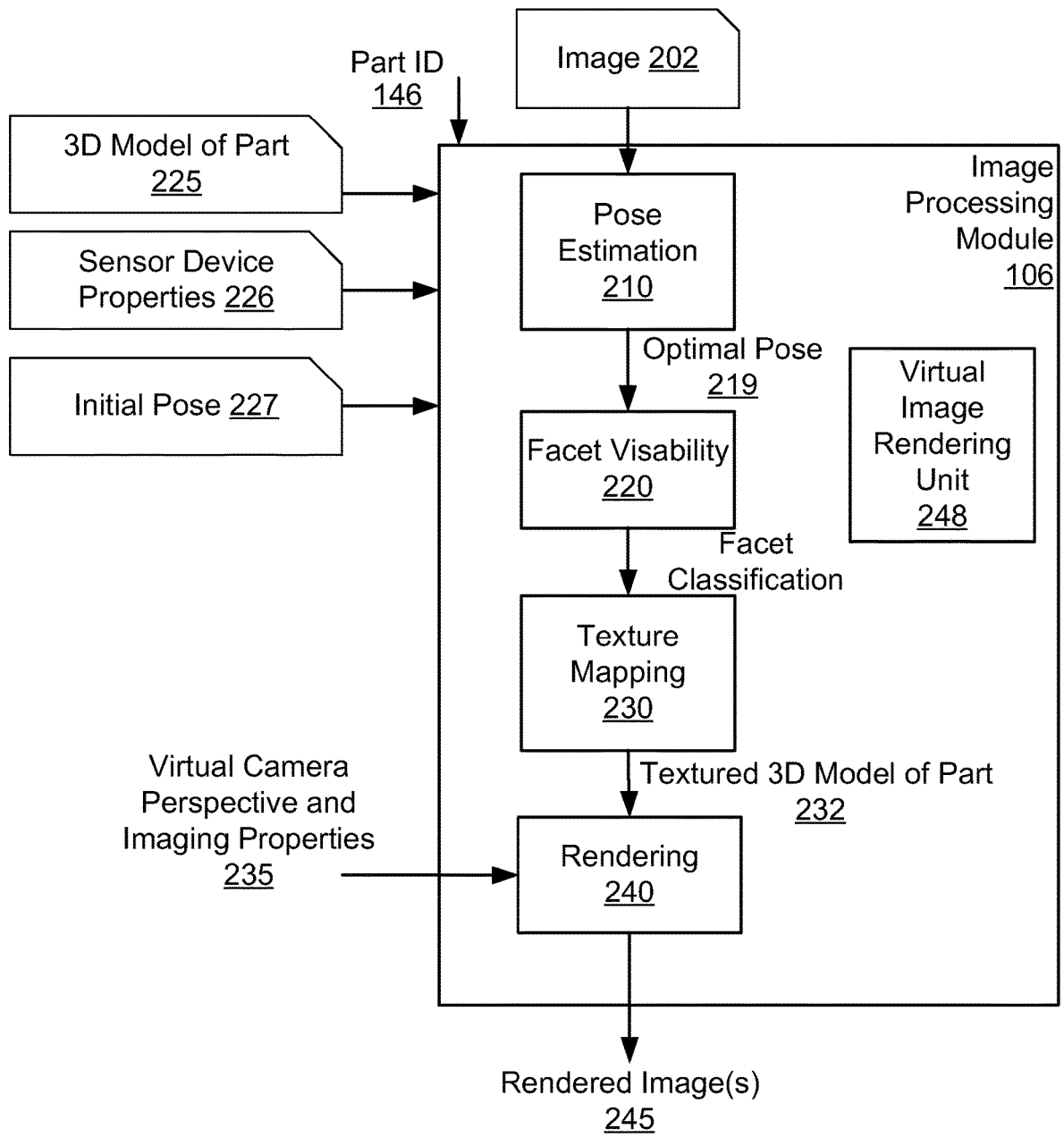
FIG. 2 is a block diagram of procedures performed by an image processing module of the system of FIG. 1, according to a first example embodiment.

As indicated in FIG. 2, in an illustrated example, image processing module 106 can receive the following input data:

(1) Image 202: Image 202 is the pixel image data generated by the image sensing device 108 in respect of manufactured part 120 and the image background.

Figure 3:
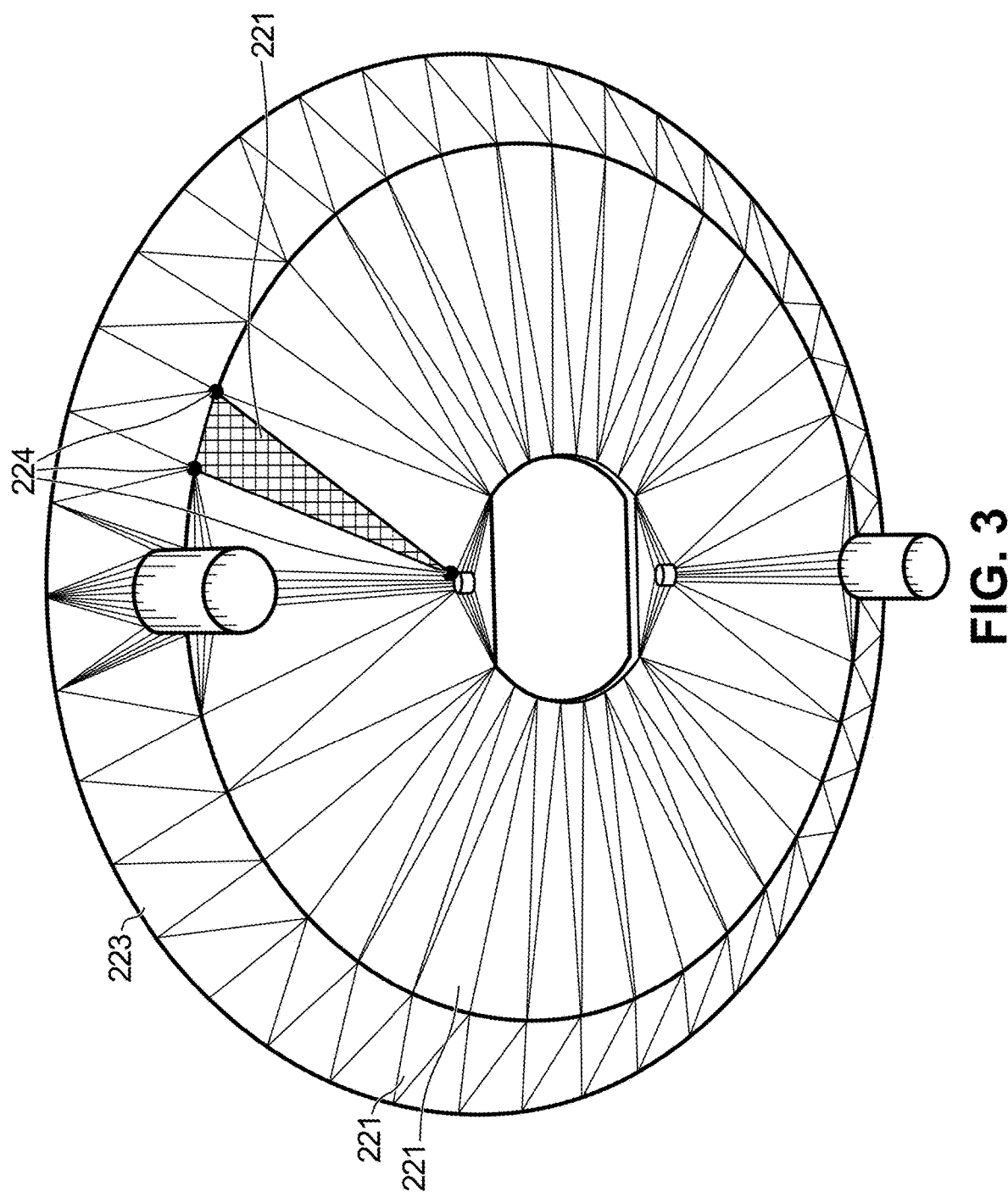
FIG. 3 is an illustration of a sample part overlaid with a polygonal mesh that defines facets of the part.

(2) 3D part model 225: 3D part model 225 is a dataset that can be derived from computer aided design (CAD) representation of part 120 as the part is intended to be manufactured. In this disclosure, the intended part represented in the 3D part model 225 is referred to as the model part, and an inspection objective of the industrial process is to determine if the manufactured part 120 conforms satisfactorily within acceptable manufacturing tolerances to the model part. In an example embodiment, the 3D model 225 is a mesh model that represents 3D physical surfaces as a set of polygonal surfaces that are each defined by a respective set of vertices. In the illustrated example, each polygonal surface (referred to in this disclosure as a facet) is a triangle defined by three vertices, although other facet shapes can be used in other embodiments. By way of reference, FIG. 3 illustrates a 3D part mesh model 225 as a set of triangular facets 221 that approximate a model part 223 that represents the intended structure of manufactured part 120. The vertices 224 that define one of the facets 221 are illustrated. The 3D coordinates of all of the facet vertexes are defined in the 3D part model 225. By way of example, 3D part model 225 may comprise a dataset that is arranged in a polygon file format (PLY), which is a known file format for storing graphical objects that are described as a collection of polygons. A typical PLY object definition is a list of (x,y,z) triples for vertices and a list of facets that are described by indices into the list of vertices. Additional properties can be attached to the elements (e.g., vertices and faces) of an object (where the object in the present case is the model part).

(3) Image Sensor Device Properties 226: Image Sensor Device Properties 226 can include metadata about the image sensor device 108 such as focal length, field of view, principle point, image resolution and size in pixels, known lens artifacts, etc., that can affect collected image data.

(4) Initial pose data 227: As discussed above, initial pose data 227 indicates an expected pose (initial pose) of the target 120 relative to the image sensor device 108.

In example embodiments, image processing module 106 is also provided with the part ID 146 for the manufactured part 120 that is represented in the image 202.

As indicated in FIG. 2, image processing module 106 either includes or has access to a virtual image rendering unit 248 (e.g., a virtual camera model). Virtual image rendering unit 248 can function as a computer implemented model of an image sensing device (for example, as a model of image sensing device 108 that captured image 202) and is configured to render virtual images of a part from the perspective of an input pose (for example the initial pose 227) and input sensor device properties 226 based on the 3D part model 225. In example embodiments, the format of virtual images can be specified (for example, thermal image, optical image, depth image, etc., as well as image size and resolution).

Image processing module 106 includes a pose estimation procedure 210. Pose estimation procedure 210 performs a localization routine to determine transformation data that can be used to transform the pose of a virtual image that is rendered using the initial pose that is indicated in initial pose data 227 to the actual pose of manufactured part 120 in the image 202. Pose estimation operation 210 can be performed in a number of different ways. An illustrative example will be described with reference to FIGS. 4, 5 and 6.

Figure 4:
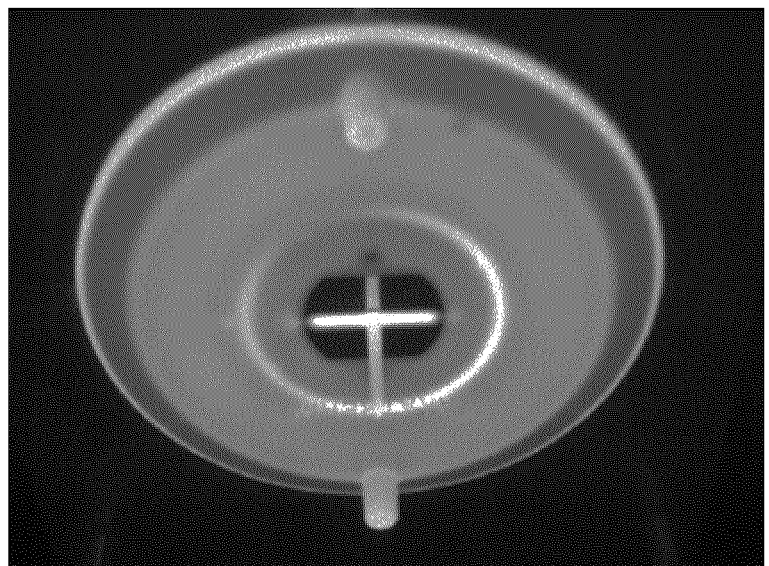
FIG. 4 illustrates an edge detection operation performed as part of a pose estimation procedure of the image processing module of FIG. 2.
Figure 4:
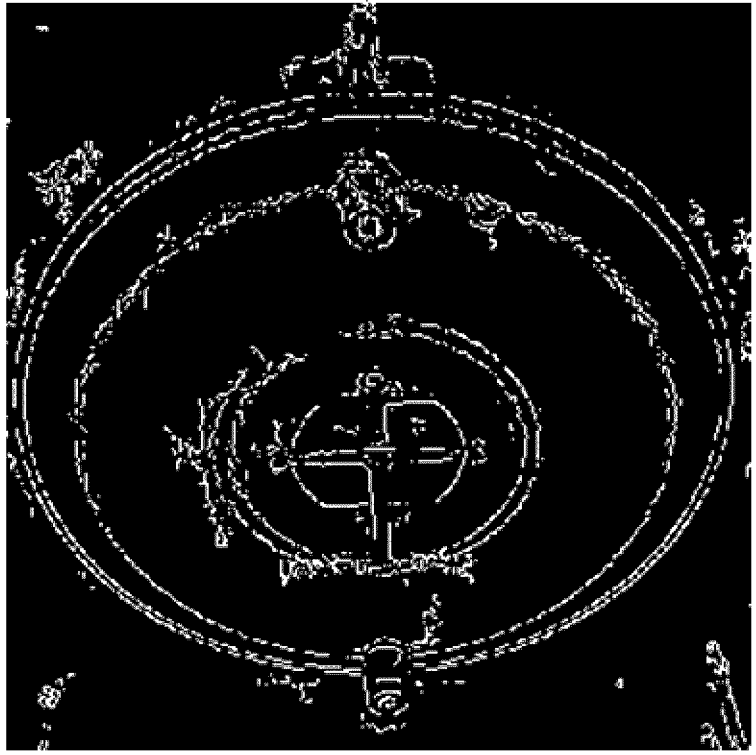

As indicated in FIG. 4, pose estimation procedure 210 includes an image edge detection operation 211 in which the 2D edges of the manufactured part 120 are extracted from the image 202 to generate a corresponding 2D part edge image 212. Part edge image 212 is a pixel representation of the image 202 in which structural edges of the manufactured part 120 are represented and other image data is absent, thereby drastically reducing the amount of image data. Edge detection can allow various different image formats from different types of sensor image device types to be processed by the image processing module 106. Image edges are identifiable under various illumination conditions and on many textureless industrial parts.

A variety of known edge detection techniques can be applied to implement image edge detection operation 211, including for example the multi-stage Canny edge detector algorithm.

Figure 5:
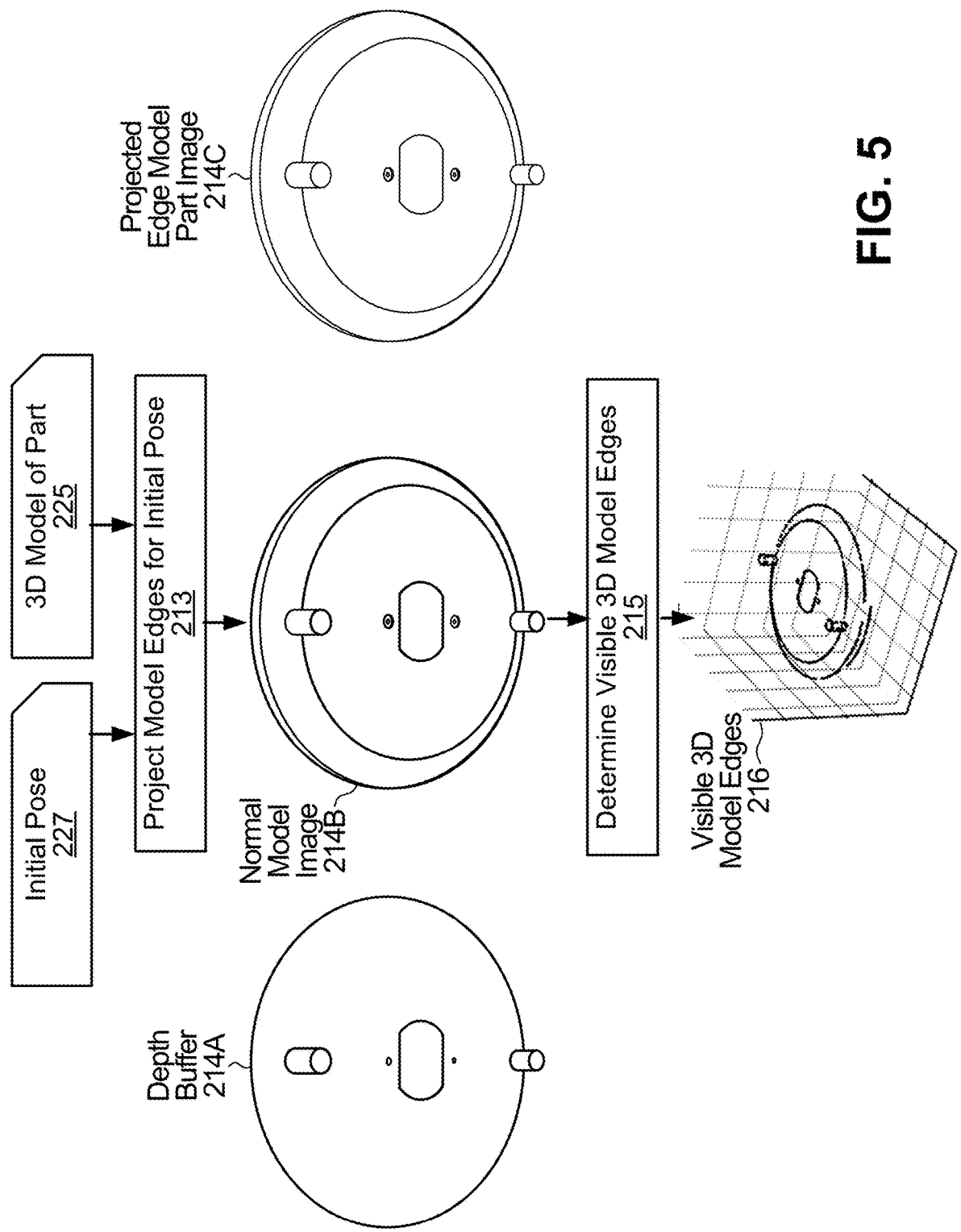
FIG. 5 illustrates edge projection operations performed as part of the pose estimation procedure of the image processing module of FIG. 2.

With reference to FIG. 5, pose estimation procedure 210 also includes a model edge projection operation 213 that processes the initial pose data 117 and the 3D part model 225 to render a 2D projected edge model part image 214C that represents the model part in the initial pose. In an illustrative example, model edge projection operation 213 may include the following steps:

(1) Use virtual image rendering unit 248 to render a virtual depth buffer image 214A of the model part for the initial pose. As known in the art, a depth buffer image represents the relative distances of surfaces included in an image relative to particular perspective by assigning different Z-values to image pixel locations.

(2) Use virtual image rendering unit 248 to render a normal map model image 214B of the model part for the initial pose. Normal map image 214B may include normal image pixel data that corresponds to the same image format used for the manufactured part image 202.

(3) Perform edge detection on each of the depth buffer image 214A and the normal map model image 214B using an edge detection algorithm (e.g., Canny edge detection) to determine 2D projected edge images for both the depth buffer image 214A and the normal map model image 214B.

(4) Combine the 2D projected edge images to generate 2D-projected edge model part image 214C that corresponds to the initial pose.

In example embodiments, the renderings of one or both of the depth buffer image 214A and normal map model image 214B are based on the sensor device properties 226, thereby allowing actual camera properties (e.g., lens artifacts such as lens distortion) to be accounted for.

As indicated in FIG. 5, pose estimation procedure 210 also includes an operation 215 to determine the visible 3D model edges for the initial pose. In this regard, the rendered 2D projected edge model part image 214C and the depth buffer image 214A are processed to un-project the 2D model edges and compute an approximation of the model edges that are visible in a 3D representation of the model part. The resulting visible 3D model edge image dataset 216 is illustrated in FIG. 5.

Accordingly, operations 213 and 215 collectively compute and project 3D model part edges for the initial pose using a rendering-based approach that may accurately identify the edges of the model, including for example curved surfaces (e.g., the projecting cylinders in the illustrated example part). During the operations, the 3D model edges inherent in the 3D part model 225 are projected onto the 2D imaging plane, accounting for the properties of the actual image sensor device 108. Appropriate sensor device lens artifacts are considered (e.g., lens distortions). In at least some examples, this can enable the 3D model edges included in the visible 3D model edge dataset 216 to be directly compared with the edges of the manufactured part 120 in the projected edge image 212 in order to accurately estimate part pose.

Figure 6:
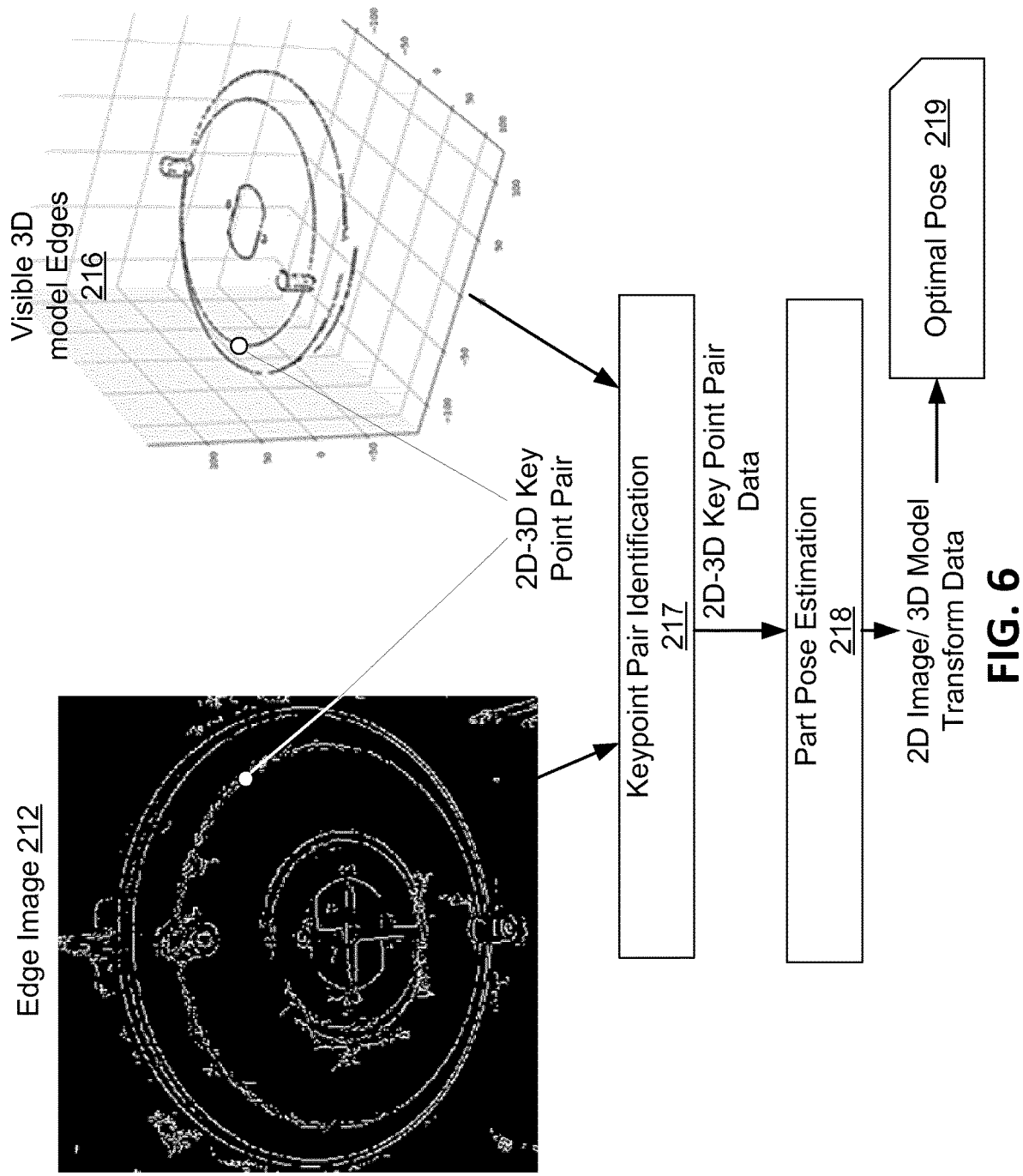
FIG. 6 illustrates a part pose estimation operation performed as part of the pose estimation procedure of the image processing module of FIG. 2.

Referring to FIG. 6, pose estimation procedure 210 includes a keypoint pair identification operation 217 and a part pose estimation operation 218. Keypoint pair identification operation 217 identifies a set of corresponding keypoint pairs that maps edge points in the 2D edge image 212 of the manufactured part 120 to corresponding edge points in the visible 3D model edge dataset 216. The set of corresponding keypoint pairs are then used by part pose estimation operation 218 to estimate the actual pose of manufactured part 120 in the image 202 relative to the initial pose and determine 2D image/3D model transform data that can be used to determine an optimal pose 219. In some examples, part pose estimation operation 218 can apply a Perspective-n-Point (PnP) pose algorithm to solve the problem of estimating the 6D relative pose—3D position and 3D orientation—between a calibrated perspective camera (e.g., image capture device 108) and a 3D object (e.g., manufactured part 120) from a set of n visible 3D points with known (X,Y,Z) object (or scene) coordinates (e.g., visible 3D model edge dataset 216) and their 2D projections with known (u,v) pixel coordinates (e.g., 2D edge image 212). In some examples, outlier data can be removed using a RANdom SAmple Consensus (RANSAC) algorithm.

Once calculated, the relative pose can be used to determine an optimal pose 219 that can be used to replace the initial pose 227 as input for the virtual image rendering unit 248 so that any future renderings based on the 3D part model 225 can be aligned with the actual part pose captured in image 202.

Referring again to FIG. 2, image processing module 106 includes a facet visibility procedure 220 that is configured to classify the visibility of each facet 221 of the model part. The facet visibility procedure 220 receives as input the optimal pose 219 and the 3D part model 225, and is configured to compute a visibility classification for each of the facets 221 of the model part based on the extent of visibility of the facet if the part were imaged by an image sensor device in the optimal pose 219. In example embodiments, facet visibility classifications are based on a prediction of what percentage of a facet is visible to the image sensor device when the model part is in the optimal pose 219 relative to the image sensor device. In an example embodiment, three classification levels are applied: (a) Visible: the entire facet is visible from the image sensor device; (b) Non-visible: the entire facet is not visible from the camera; and (c) Partially visible: the facet is only partially visible from the camera due to occlusions.

The facet visibility procedure 220 can include the following steps:

(1) a first binary virtual image of the model part is rendered by virtual image rendering unit 248 based on the optimal pose 219 and the 3D part model 225, wherein the rendered pixels correspond to portions of the model part that are visible to virtual image rendering unit 248 from the perspective of the optimal pose 219. Each rendered pixel is associated with a visible region of one or more facets 121. The first binary image is used to determine the respective number of visible pixels that map to each of the respective facets 121 of the model part.

(2) using the same resolution as used for the first binary virtual image, render a second binary virtual image of the model part that assumes all portions of the model part are visible, and use the second binary image to determine the respective total number of pixels that map to each of the respective facets 121 of the model part.

(3) For each facet 121, determine the number of corresponding visible pixels that map to the facet relative to the total number of pixels that map to the facet, and: (i) when the relative number of visible pixels that map to the facet 121 exceeds a first threshold (for example, the number of visible pixels and the number of total pixels are the same, in the case where the first threshold is 100%) then classify the facet 121 as "visible"; (ii) when the relative number of visible pixels falls below a second threshold (for example, the number of visible pixels is 0, in the case where the second threshold is 0%) then classify the facet 121 as "non-visible"; (iii) when the relative number of visible pixels falls between the first and second thresholds (for example, when some, but not all of pixels that map to a facet are visible in the case where the first threshold is 100% and the second threshold is 0%), then classify the facet 121 as "partially visible".

Figure 7:
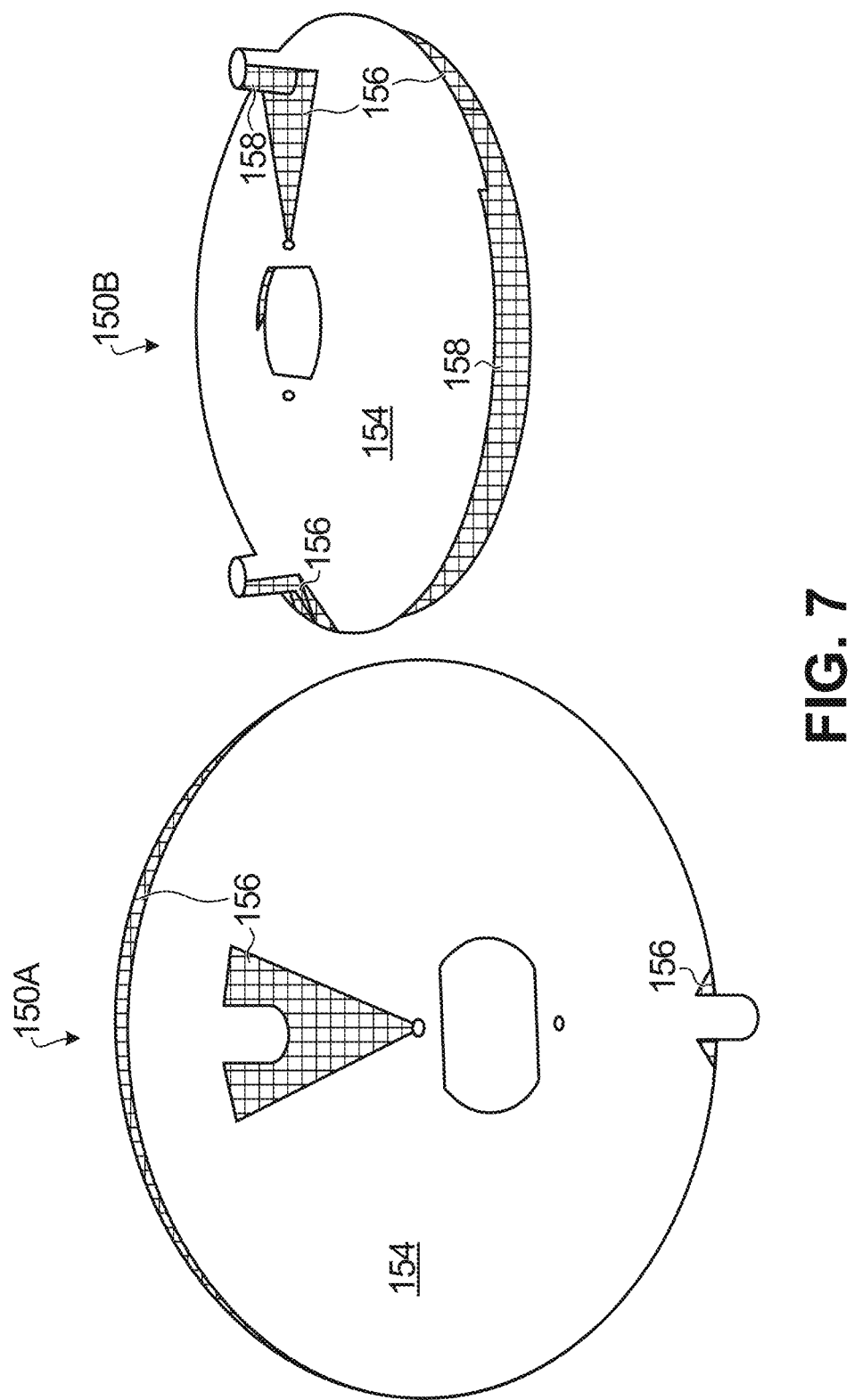
FIG. 7 shows model images illustrating visible, partially visible, and non-visible facet regions of a sample part.

By way of illustration, FIG. 7 illustrates a virtual image rendering 150A of a model part using the optimal pose 219. Surface region 154 consists of facets that have been classified as "visible" and surface regions 156 each consist of facets that have been classified as "partially visible". FIG. 7 also illustrates a further virtual image rendering 150B from a different arbitrary camera perspective other than the optimal pose 219, but which retains the facet visibility classifications of the optimal pose 219. In rendering 150B, surface region 154 consists of facets that have been classified as "visible", surface regions 156 each consist of facets that have been classified as "partially visible" and surface regions 158 each consist of facets that have been classified as "non-visible".

The output generated by facet visibility procedure 220 is facet classification data 229 that identifies (i) a list of facets 221 of the 3D model part 225 that have been classified as "visible" and (ii) a list of facets 221 of the 3D model part 225 that have been classified as "partially visible", from an image sensing device perspective that corresponds to the optimal pose 219. In example embodiments, the 3D model part 225 can be modified so that the facet classifications are attached as properties to the facets that are specified in the 3D model part 225.

Although pixel level comparisons are performed by facet visibility procedure 220 in the presently described example, other comparison methods could be used in alternative examples to classify facet visibilities. For example, ray tracing techniques could be applied to determine the amount of a facet that is visible vs. non-visible for purposes of assigning visibility classification to the facet.

Referring again to FIG. 2, image processing module 106 includes a texture mapping procedure 230 that is configured to map texture data that is included in the actual part image 202 to the facets 221 of the model part that have been classified as visible and partially visible. In this regard, the texture mapping procedure 230 is configured to apply the 2D image/3D model transform data and optimal pose 219 that was computed by pose estimation procedure 210 and the facet classification data 229 generated by the facet visibility procedure 220 to map the texture information included in the image pixels of image 202 to the visible and partially visible facets 221.

In an example embodiments, texture mapping can be done through a two stage mapping procedure and a two stage rendering process as follows:

(1) Based on the optimal pose 219 and the list of visible and partially visible facets, a set of texture coordinates is computed for each visible and non-visible facet that maps a corresponding group of pixels included in the image 202 to the visible facet. For example, in the case of a triangular facet, each set of (X,Y,Z) vertex coordinates of the facet are mapped to a respective (u,v) pixel coordinate as viewed according to the optimal pose 219. In example embodiments, the 3D model part 225 can be modified so that the 2D pixel coordinates mapped to each vertex are attached as properties to each vertex in a textured 3D part model 232.

(2) Based on the optimal pose 219 and the list of partially-visible facets, a set of texture coordinates is computed for each partially-visible facet that maps a corresponding group of pixels included in the image 202 to the partially visible facet. Again, in example embodiments, the 3D model part 225 can be modified so that the 2D pixel coordinates mapped to each vertex are attached as properties to each vertex in a textured 3D part model 232.

Figure 8:
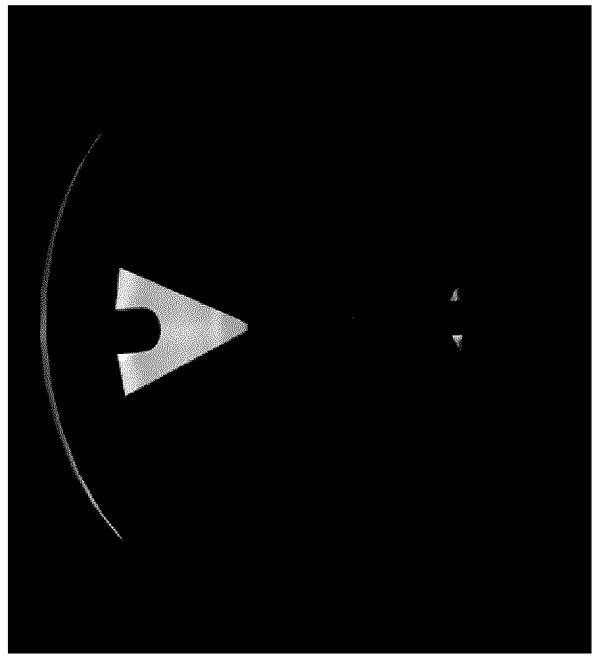
FIG. 8 shows an example of a visible texture image and a partially visible texture image corresponding to the sample part.
Figure 8:
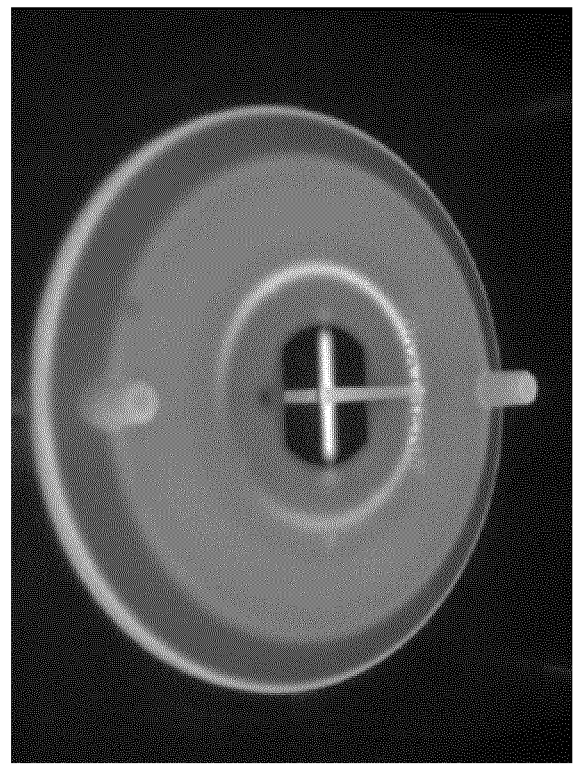

(3) The pixel values included in the original image 202 can then be mapped as textures to respective facets of the 3D part model 225 using a two stage rendering process:

Stage (I)—each visible facet is rendered in a virtual visible texture image (see for example image 160 in FIG. 8) by projecting the pixel values from original image 202 to the visible facets of 3D part model 225 using the computed texture coordinates for each of the facets. In some examples, the set or group of pixels from original image 202 can also be attached as properties to the facets in the textured 3D part model 232 to incorporate the texture data directly into textured 3D part model 232.

Stage (II)—a virtual partially visible texture image (see for example image 162 in FIG. 8) is rendered. In an example embodiment a virtual partially visible texture image is rendered by applying a zero alpha mask over all pixels in the original image 202 except for the pixels associated with the partially visible facets. In some examples, the set or group of pixels from original image 202 can also be attached as properties to the partially visible facets in the textured 3D part model 232 to incorporate the texture data directly into textured 3D part model 232.

Accordingly, the rendered textures for each of the visible and partially visible facets (corresponding to the optimal pose 219) can be encoded into the textured 3D part model 232 for future use.

As the virtual partially visible texture image (e.g., image 162) is a subset of the virtual visible texture image (e.g., image 160), in some examples it is only necessary to include the non-zero pixel coordinates associated with the alpha mask as additional properties in the textured 3D part model 232. These partial visibility coordinates can be encoded as properties into the textured 3D part model 232 to provide a compact representation of the correctly textured part.

Accordingly, the textured 3D part model 232 provides a model representation of manufactured part 120 that has been adjusted to represent the optimal pose and, in at least some cases, imaging properties of the particular image sensing device 120 such as lens artifacts (which may for example be detected during an initial system configuration and setup). In at least some examples lens artifacts may be variable based on time and/or environmental. For example, humidity and temperature may rise later in the day, affecting lens distortion.

The image processing module 106 further includes a rendering procedure 240 that can receive as input a virtual camera perspective that can be different than that of the optimal pose 219, and also camera imaging properties (e.g. resolution, focal length, etc. that can be different than those of the image sensing device 108 used to capture image 202. Rendering procedure 240 can call on virtual image rendering unit 248 to render a virtual image 245 of the manufactured part 120 according to the input camera perspective and imaging properties 235, based on the textured 3D part model 232.

In some examples, original image 202 may be used in conjunction with textured 3D part model 232 by virtual image rendering unit 248, for example when the textured 3D part model 232 does not directly encode as facet properties the pixel texture data from the image 202, but rather encodes only vertex to pixel coordinate mapping. In some examples, access to original image 202 may not be required during later image rendering stages, for example when the textured 3D part model 232 directly encodes pixel texture data from the image 202 as facet properties.

Image processing module 106 enables a set of normalized virtual images 245 to be generated that correspond to a set of original part images 202 of multiple manufactured parts 120 of the same type. These normalized images 245 can enable for more accurate training of an ML model for performing an image classification task (e.g., "pass", "fail" quality inspection test), and can enable for more accurate classification using a trained ML model.

The image processing module 106 procedures described above in respect of a single image from a single image sensing device 108 can be performed for each of the image sensing devices 108(1) to 108(N) to provide a respective textured 3D part model 232 (or respective additional properties to the same 3D part model 232) corresponding to the respective optimal pose determined for each of the image sensing devices 108(1) to 108(N) relative to the part 120. Furthermore, rendering procedure 240 can be used to generate a respective virtual image 245 from each of the N textured 3D part models 232 that corresponds to a common pose based on the virtual camera perspective and imaging properties 235, thereby allowing a set of normalized images of manufactured part 120 to be rendered across the set of image sensing devices 108(1) to 108(N). In some examples, multiple images can be blended together to provide a composite virtual image.

By way of overview, the procedures applied by image processing module 106 effect a rendering pipeline (which for example may be based on OpenGL™) that can be summarized as follows: (1) pose estimation procedure 210: applies a localization routine which determines the optimal pose of the part in an image using a known 3D model; (2) facet visibility procedure 220: performs a facet visibility routine which classifies the visibility of each facet from the 3D model as visible, non-visible, or partially visible with respect to the camera; (3) texture mapping procedure 230: performs a texture mapping routine which correctly maps textures to the visible and partially visible facets of the 3D model, accounting for lens artifacts (e.g., lens distortions); (4) rendering procedure 240: performs a rendering routine to render arbitrary views of the textured 3D model from arbitrary virtual cameras, and can include texture blending routines to appropriately blend the multiple mapped textures.

Figure 14:
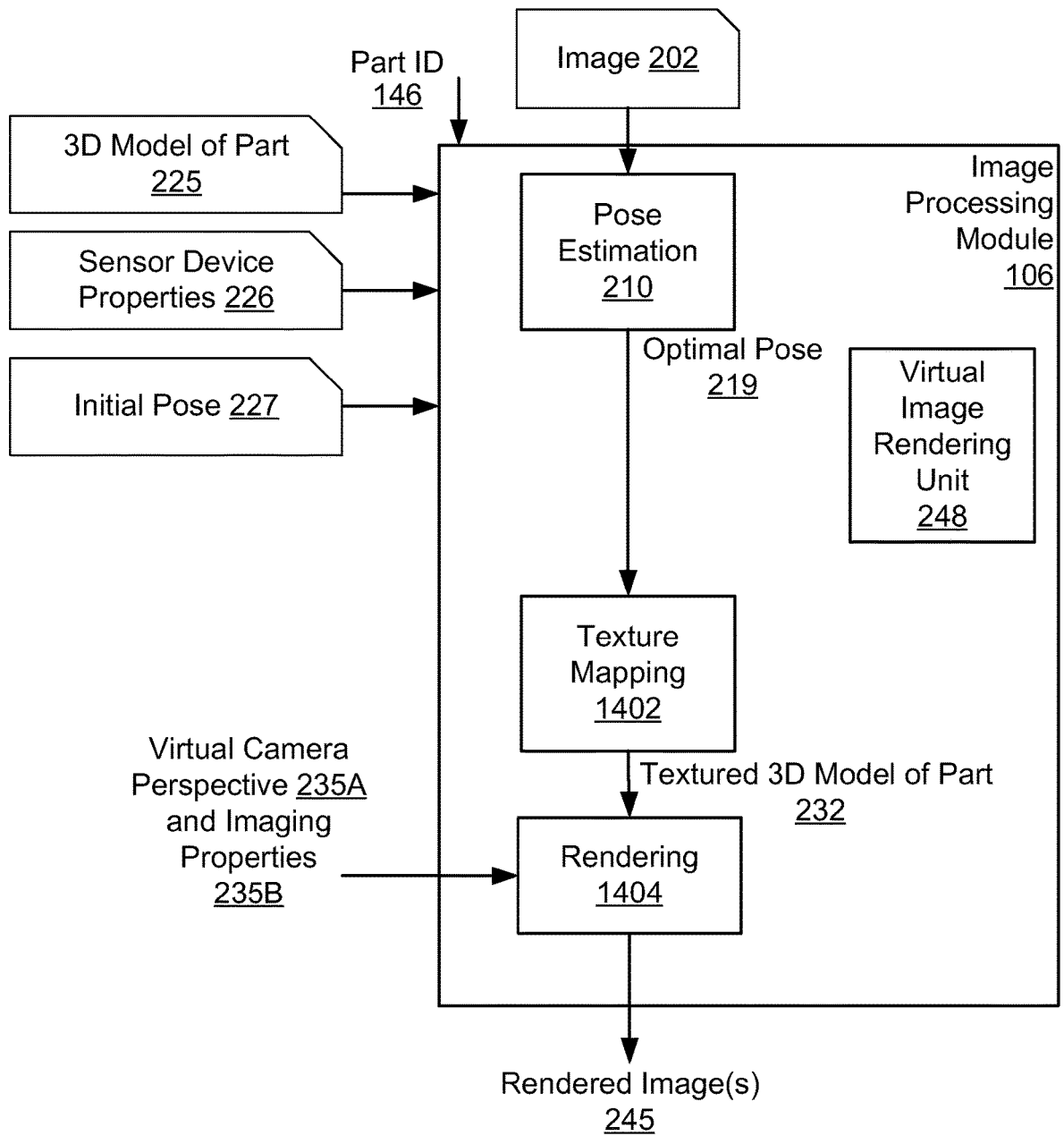
FIG. 14 is a block diagram of procedures performed by an image processing module of the system of FIG. 1, according to a second example embodiment.

In an alternative configuration of image processing module 106, the facet visibility procedure 220 can be embedded within the rendering procedure 240. Rendering-based routines, such as shadow mapping (i.e., rendering a virtual light in place of the optimal camera), can be used to project shadows onto the non-visible regions of the partially visible facets. In some cases, computing facet visibility may not be necessary and can wholly be replaced by rendering shadows during the rendering procedure. In this regard, FIG. 14 is a block diagram of procedures performed by an image processing module 106 of the system of FIG. 1, according to a second example embodiment in which facet classification is omitted and shadow mapping is performed during rendering. The procedures of FIG. 14 are the same as those described above in respect of the block diagram of FIG. 2, with the exception of the following modifications.

Compared to the procedures described above in respect of FIG. 2, in the embodiment of FIG. 14, facet visibility procedure 220 is omitted, and texture mapping procedure 230 and rendering procedure 240 are respectively replaced with modified texture mapping procedure 1402 and rendering procedure 1404.

Unlike texture mapping procedure 230, texture mapping procedure 1402 does not receive any facet visibility classification information. Thus, texture mapping procedure 1402 is configured to map texture data that is included in the actual part image 202 to facets 221 of the model regardless of facet visibility, as opposed to mapping texture data only to facets that have been classified as visible and partially visible, as is the case in texture mapping procedure 230. In this regard, the texture mapping procedure 230 is configured to apply the 2D image/3D model transform data and optimal pose 219 that was computed by pose estimation procedure 210 to map the texture information included in the image pixels of actual part image 202 to facets 221.

In an example embodiments, texture mapping procedure 1402 can be performed as follows:

(1) Based on the optimal pose 219, a set of texture coordinates is computed for each facet that maps a corresponding group of pixels included in the image 202 to the facet. For example, in the case of a triangular facet, each set of (X,Y,Z) vertex coordinates of the facet are mapped to a respective (u,v) pixel coordinate as viewed according to the optimal pose 219. In example embodiments, the 3D model part 225 can be modified so that the 2D pixel coordinates mapped to each vertex are attached as properties to each vertex in a textured 3D part model 232.

(2) The pixel values included in the original image 202 can then be mapped as textures to respective facets of the 3D part model 225 using rendering process whereby each facet is rendered in a virtual visible texture image (see for example image 160 in FIG. 8) by projecting the pixel values from original image 202 to the facets of 3D part model 225 using the computed texture coordinates for each of the facets. In some examples, the set or group of pixels from original image 202 can also be attached as properties to the facets in the textured 3D part model 232 to incorporate the texture data directly into textured 3D part model 232.

Data occlusions can be present in the textured 3D part model 232 in the cases of facets of 3D part model 225 that are not mapped to a corresponding group of pixels in the actual image 202.

Accordingly, the rendered textures for each of the facets (corresponding to the optimal pose 219) can be encoded into the textured 3D part model 232 for future use.

In the case of rendering procedure 1404, rendering procedure 240 can receive as input the textured 3D part model 232, the sensor device properties 226, the optimal pose 219, a virtual camera perspective 235A and virtual camera imaging properties 235A. Rendering procedure 1404 applies a two stage rendering process to render the textured 3D part model 232 while also accounting for texture data occlusions on the surface of the textured 3D part model 232:

Stage (I)—Rendering procedure 1404 calls on virtual rendering unit 248 to render a first virtual depth buffer image of the textured 3D part model 232 based on the sensor device properties 226 and the optimal pose 219. This first virtual depth buffer image is used for shadow mapping.

Stage (II)—Rendering procedure 1404 calls on virtual rendering unit 248 to render a second virtual depth buffer image of the textured 3D part model 232 based on the virtual camera perspective 235A and the virtual camera imaging properties 235B. Rendering procedure 1404 then calls on a shadow mapping procedure during which the value of each pixel in the second depth buffer image is compared to an associated pixel in the first depth buffer image and texture data from textured 3D part model 232 is mapped to the pixel in the second depth buffer image when the value of the pixel in the second depth buffer image is lower than that of the associated pixel in the first depth buffer image, thereby providing shadow mapping.

Figure 15:
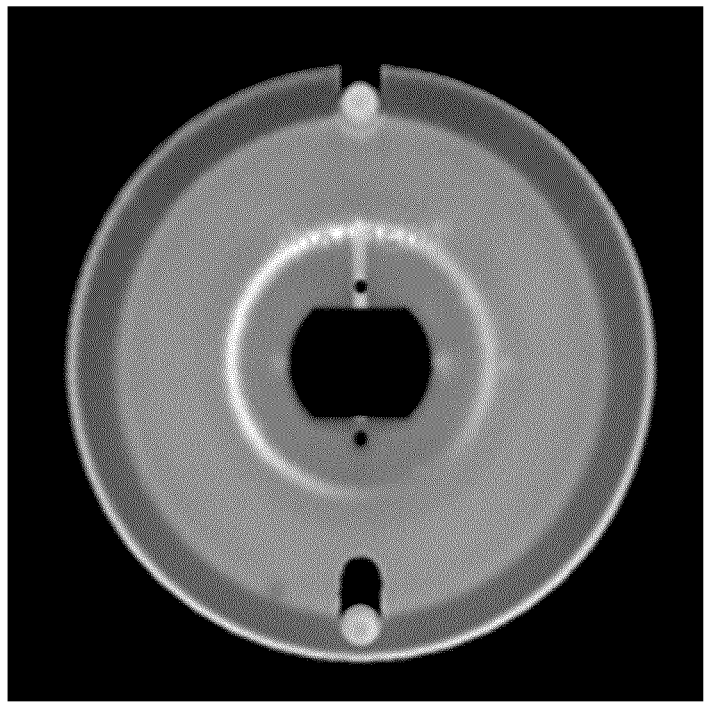
FIG. 15 shows examples of rendered images.
Figure 15:
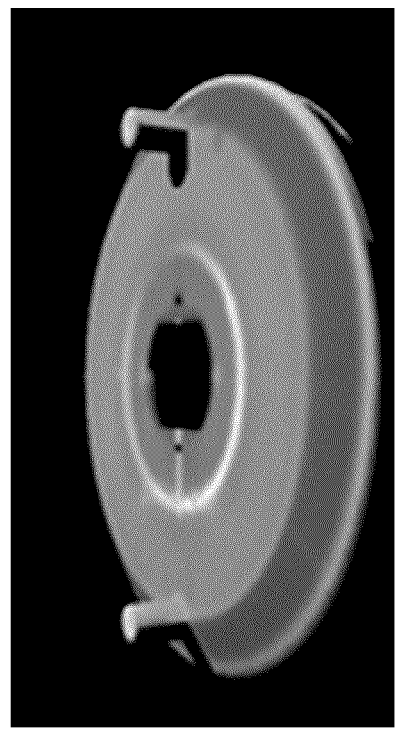

Rendering procedure 1404 effectively renders a light source from the optimal pose 219 and leverages the shadow information that is provided by differences in corresponding pixel values between the current and previous depth buffers to enable or disable the rendering of texture data on the surface of the textured 3D part model 232 that is rendered from some other camera perspective 235A and imaging properties 235B. By way of illustration, FIG. 15 shows two rendered images 102, 1504, that visualize the textured 3D part model 232 from different perspectives while simultaneously accounting for data occlusions.

In some examples, the texture mapping provided by image processing module 106 can ensure that the image textures, captured by various types of imaging sensors (e.g., colour, monochrome, near-infrared, infrared, etc.), are accurately mapped onto the surface of the corresponding 3D model. This connects the image pixel data to the spatial 3D model data and allows for novel viewpoints of the part, as seen from a virtual camera, to be rendered. This better conditions the images for machine learning as the unwanted data variabilities (e.g., part pose variations, background variations, etc.) can be removed from the image datasets. The texture mapping is not limited to a single image and multiple images from various types of imaging sensors can be mapped as textures onto the same 3D model. Arrays of imaging sensors can be deployed with varying view-points to provide adequate part coverage to perform a reliable inspection. For example, two image sensor devices, each with a different viewpoint, may be required to achieve a complete inspection coverage. Both images can be mapped as textures onto the same 3D model and then rendered from a novel viewpoint to generate ideal inspection images that are impossible to obtain from a real camera.

Figure 10:
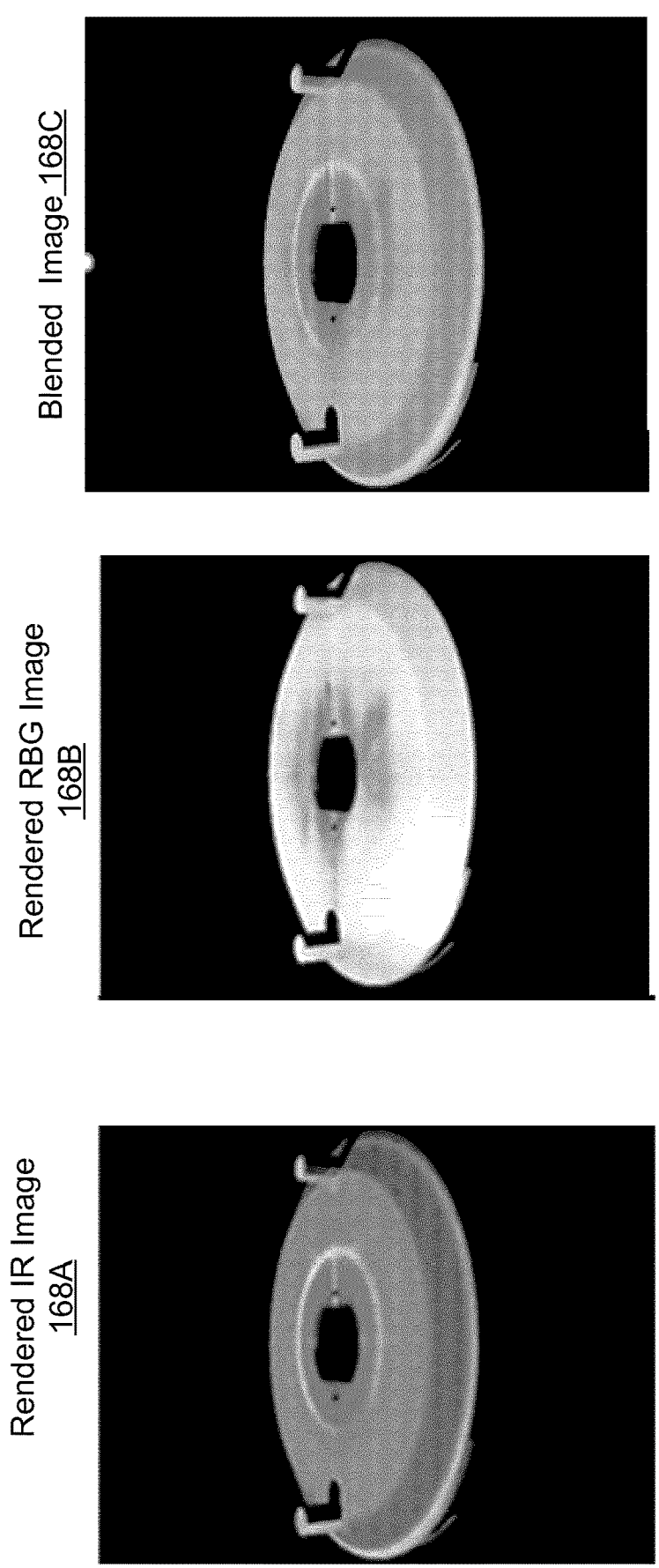
FIG. 10 shows examples of a rendered IR image, a rendered RGB image, and a corresponding blended image.

Texture blending functions can be used to combine different image types to provide new insights into part quality that may be impossible to discern when considering the images separately. By way of illustration, FIG. 10 shows an thermal image 168A rendered by a virtual thermal camera based on IR texture data properties included in a textured 3D part model, an optical image 168B rendered for the same pose by a virtual optical camera based on RGB texture data properties included in the textured 3D part model, and a blended image 168C rendered for the same pose by a virtual optical camera based on both the IR texture data properties and the RGB texture data properties.

In some applications, the mapping of images as textures onto the 3D model can address image registration problems that can result from pose variations as the corresponding pixels from the various mapped textures are all mapped to a common 3D model. This can allow for an automatic registration of various regions of interest (ROI) between the different textures, which can help to reduce labelling times and may also help to identify defects that are not easily detected at certain viewpoints. Furthermore, ROIs can be defined directly on the textured 3D model and these can be mapped back to the associated input images, providing more efficient labelling workflows.

The textured 3D model encodes a variety of additional inspection data that is not accessible through the images alone. Visualizations of this data can be rendered at any camera pose, whether that be the pose of the real camera or a virtual camera, and can be overlaid on top of existing images. For example, the additional inspection data can include: (a) Surface visibility—data that identifies the regions of the part's surface that are visible (i.e., the inspection coverage) from one or more of the deployed image sensing devices (e.g., this information is present in the facet classification data added as properties to the 3D part model by facet visibility procedure 220); Depth map—data that identifies the corresponding depth of the part for each pixel on the part surface (e.g., this information is included in depth buffer 214A generated by pose estimation procedure 210); surface normals—data that identifies the corresponding angles of the part surface relative to the image sensing devices for each pixel; Visible model edges—data that identifies the visible edges of the 3D model from the image sensing device pose (e.g., this information is included in the projected edge image 212 generated by pose estimation procedure 210).

The image and model generated by image processing unit 106 can provide multiple interaction possibilities for operators that may be looking to better understand the inspection performance. For example, a current camera installation may not provide adequate inspection coverage and movement of the camera can be beneficial. Note that many other data visualizations are also possible. In some applications, the pixel size is an important consideration and this type of information can be provided for an in-depth analysis of the inspection performance. The textured 3D model contains the relevant inspection data that is mapped from the images. In many cases, it is desirable to modify the textured 3D model to remove regions that are not considered by the inspection. This can further remove irrelevant data to allow machine learning models to focus on the relevant part features. For example, clipping planes can be added to remove the selected regions of the part to generate specialized images that only show the relevant inspection data.

The 3D visualization pipeline of image processing unit 106 introduces other possibilities for image augmentation. The spatial information obtained from the 3D model allows for varying inspection conditions to be synthetically generated, which can add significant robustness to the original training and inference datasets. This can include: creating novel illumination conditions by adding virtual illuminants to the rendering environment, adjusting the specifications of the virtual camera (e.g., resolution, distortion parameters, focus, etc.), and warping the 3D model geometry.

Referring again to FIG. 1, in some examples, control module 112 is configured to receive images, for example rendered images 245 from image processing module 106. The control module 112 is configured to process the received image data and take actions based on such processing. In some examples, the actions may include classifying a target component 120 as passing or failing a quality standard. In some examples, the actions may include generating control instructions for one or more elements of industrial process 116. In some examples, the actions may include transmitting data, including image data, to configuration module 124 and/or client module 128.

In example embodiments, control module 112 is configured with one or more prediction functions $Y=f(X)$ that are configured to estimate in real time one or more attributes a part 120 based on the data included in one or more virtual rendered images 245, where Y indicates a predicted value and X represents the 2D array of pixel values embedded in one or more rendered images 245. In at least some examples, some or all of the prediction functions may be machine learned functions that have been learned by training a machine learning algorithm, as described in greater detail below. In some examples, some or all of the prediction functions may be regression functions that output real value attributes, and in some examples some or all of the functions may be classification functions that estimate a class attribute (e.g. fail or pass) from among a set of candidate classes.

In some examples control module 112 is configured to take different actions based on predicted values, including for example sending a message to a further module such as a process control unit 136. Such a message may for example be a control instruction to activate a process control unit 136 to route the part 120 in either a first direction or a second direction based on whether the predicted value is a "pass" or "fail". The message may cause client module 128 to issue an alert message for an operator indicating a "failed" assessment.

In some examples, one or more of the functions implemented by control module 112 may be configured to estimate attributes that may be used to automatically adjust the industrial process. For example, one or more learned predictive functions may be configured to generate, based on one or more virtual thermal images 245, a real value attribute indicating an estimated change to a process control variable. An example of such an attribute may be "3.5 degree" for an increase in the heating temperature applied to part component 120. The control module 112 can then provide a message in the form of a control instruction to a process control unit 136 to increase the heating temperature applied to future parts 120 by 3.5 degrees going forward.

As noted above, one or more of the predictive functions implemented by control module 112 may be machine learned functions that have been learned by a machine learning algorithm. As discussed below, in example embodiments configuration module 124, client module 128 and control module 112 interact with each other to collect training data, learn the predictive functions, and deploy the predictive functions to control module 112. In some examples, the processing performed by predictive functions on input thermal images is defined by a set of learned parameters W, and learning the predictive functions comprises learning parameters W at the configuration module 124 using a machine learning algorithm and training data.

Figure 11:
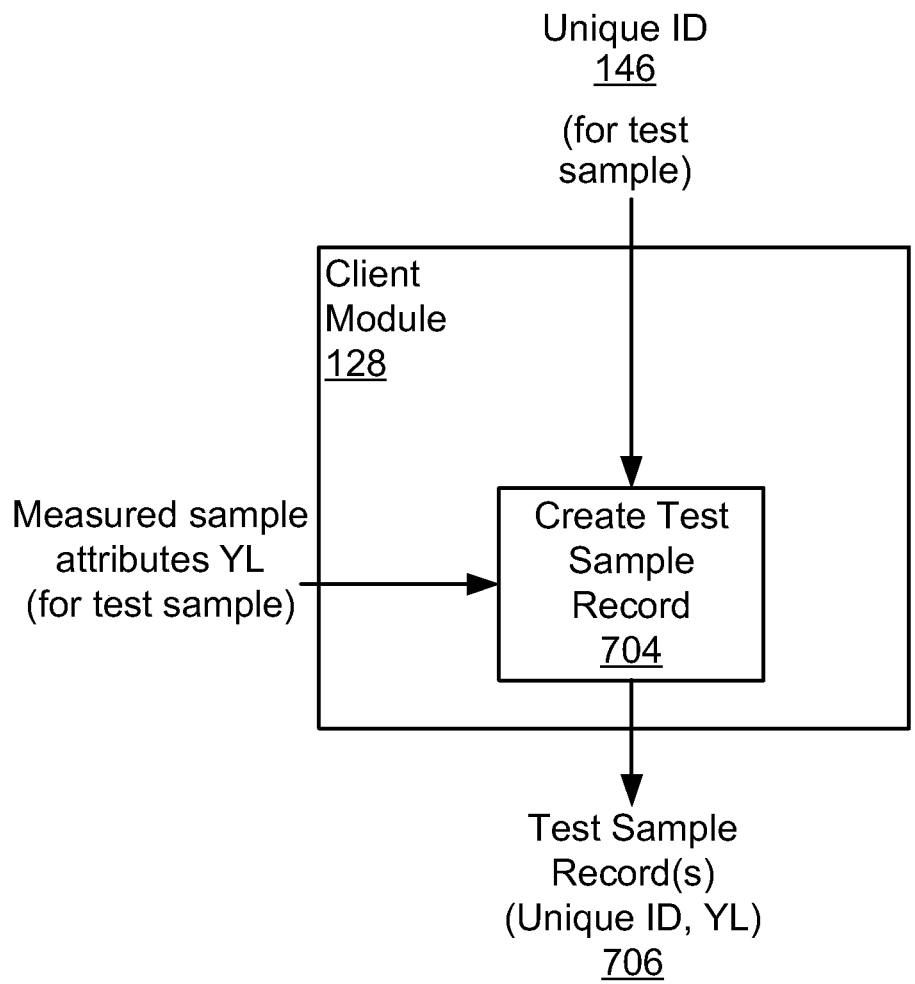
FIG. 11 is a block diagram of training sample collection operations performed by a client module of the system of FIG. 1.

According to example embodiments, training data is collected over an initial configuration period for industrial process 116. In one example embodiment, during an initial configuration period, virtual images 245 are generated by virtual imaging rendering unit 248 for a plurality of parts 120 over multiple manufacturing periods. In some examples, a manufacturing period is a duration of time over which process variables are assumed to be relatively constant, and may coincide with a manufacturing shift such as an 8-hour period. These virtual thermal images 245, each of which may be respectively associated with a unique component ID for component 120 (e.g. metadata for each virtual thermal image 245 may include a respective component ID), are provided to control module 112. During the initial configuration period, test sample parts 120 are selected for quality verification analysis. The test samples may be selected at different times during the manufacturing period (e.g. within the first 30 minutes and within the last 30 minutes). The test samples are subjected to physical analysis to physically measure and assign (e.g., manually) sample attributes YL, including for example $YL_{A1}$="Pass" or "Fail". In example embodiments, as illustrated in FIG. 11, client module 128 may be configured to perform the following: (1) receive unique component ID 146 for a test sample component 120 through an interface device (e.g. barcode or RFID reader); (2) receive measured sample attributes YL for test sample component 120 through an interface device (e.g. through a digital measurement device such as an electronic caliper or laser measurement device or manual operator keyboard entry); (3) as indicated by block 704, create and store test sample record 706 including unique ID and measured sample attributes YL. Accordingly, over multiple manufacturing periods, client module 128 can generate a growing set of test sample records.

Figure 12:
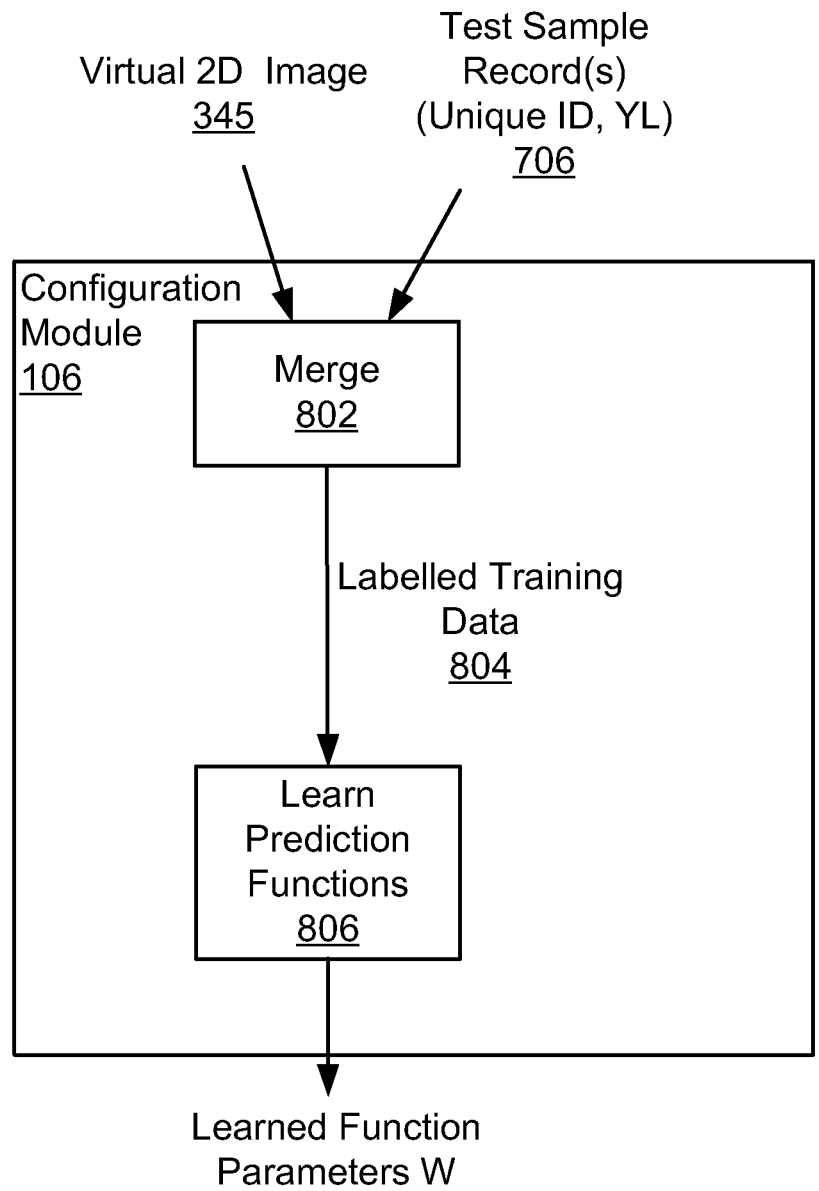
FIG. 12 is a block diagram of an ML model training operation performed by a configuration module of the system of FIG. 1.

In example embodiments the test sample records 706 are communicated to configuration module 124, along with virtual images 245 to be used for training purposes. In this regard, FIG. 12 illustrates an example of operations that may be performed at configuration module 124 during an initial configuration period. As indicated by merge operation 802, in example embodiments, configuration module 124: (1) receives virtual 2D thermal images 245 (which may for example be communicated to configuration module 106 by control module 112 via a combination of networks 118 and 132); and (2) receives test sample records 706 (which may for example be communicated to configuration module 106 by client module 128 via a combination of networks 118 and 132). Merge operation 802 is configured to associate, based on unique component IDs 146, the virtual thermal images 245 generated in respect of each test sample component 120 with the test sample records 706 generated in respect of the test sample component 120 and thereby provide a training set of labeled training data 804. It will be appreciated that in some examples, merging of the virtual thermal images 245 and test sample records may be performed at a different module such as image control module 106 or client module 128.

In at least some example embodiments, multiple similar industrial processes 116 for producing identical components 120 may exist at a particular industrial process location or may be distributed among multiple industrial process locations. Each such industrial process 116 may be similarly configured with system modules that enable respective sets of virtual thermal images 245 and test sample records 706 to be generated in respect to each of the processes. Accordingly, in some example embodiments, the merge operation 802 of the configuration module may be configured to generate labeled training data 804 that is a compilation of virtual images 345 and test sample records 706 from multiple industrial processes 116 producing the same components 120. It will be appreciated that this can provide an enhanced amount of labeled training data that can be used to learn prediction functions.

As indicated in FIG. 12, configuration module 106 is configured to perform a learning operation 806 to learn one or more prediction functions Y=f(X) based on labeled training data 804. As noted above, learned prediction functions Y=f(X) can be used by control module 112 to estimate one or more attributes of the parts 120 based on the pixel data included in virtual images 245. In at least some examples, learning operation 806 applies one or more machine learning algorithms to learn one or more prediction functions.

Once the prediction functions are learned, the configuration module 124 can then communicate the learned prediction functions through one or more networks 118, 132 to one or more control modules 112 so that the learned prediction functions can be applied in the manner noted above. In some examples, communicating the learned prediction functions includes sending the parameters W that have been learned in respect of the functions, thereby enabling control module 112 to implement the prediction function.

In some examples, after an initial configuration of the system 100 is performed, the prediction functions may be periodically updated. In this regard, the labeled training data 804 may be supplemented over time with new images 245 and corresponding test sample records 706, and the updated labeled training data then used by learning operation 806 to relearn the relevant prediction functions that can then be deployed to one or more control modules 112.

The quality prediction function described above is one example of many different possible prediction functions that could be learned at configuration module 124 for deployment at control modules 112 across one or more systems 100. In some examples, neural network structures could be used to implement prediction functions.

In some examples, image processing module 106 is configured to generate multiple virtual rendered image 245 realizations from each observed image 202, thus providing multiple training images for each part 120. The target attributes that are measured during quality verification analysis in respect of a single part can then be applied as training labels to the multiple virtual rendered images 245 of the respective part 120, resulting in an enlarged set of labeled training data 804.

Accordingly, the number of virtual images that can be labelled for use as training data based on actual target attribute measurements obtained from a single part 120 can be amplified. Additionally, in some examples, the additional virtual images could also be used during real-time analysis to provide additional input data to the functions implemented on control module 112.

Figure 9:
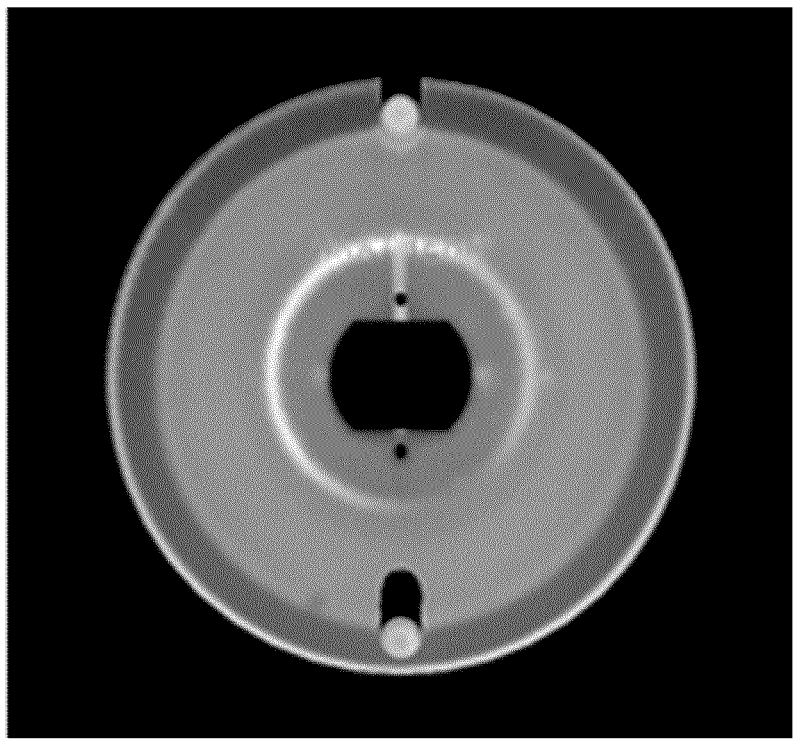
FIG. 9 shows two examples of rendered images from different perspectives.
Figure 9:
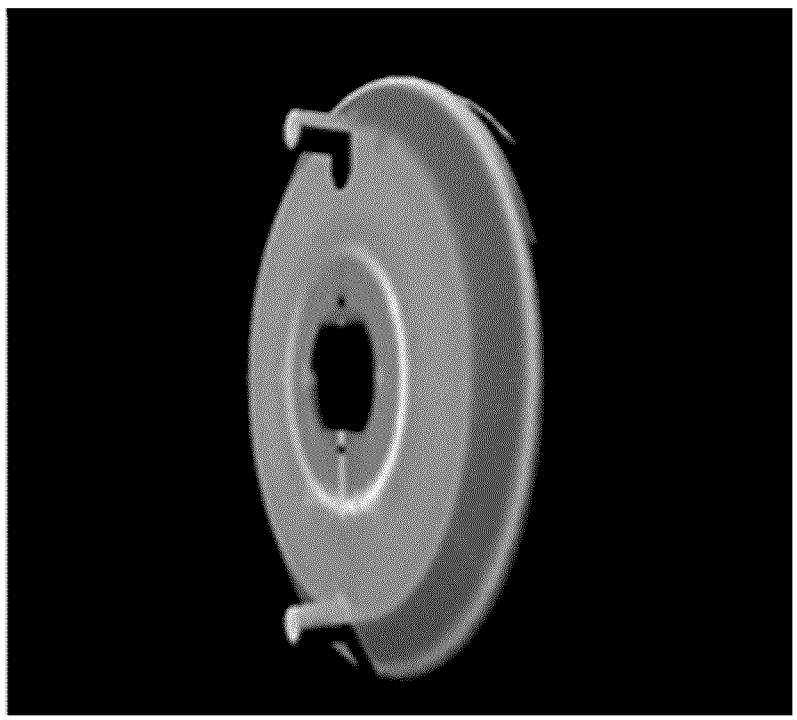
Figure 13:
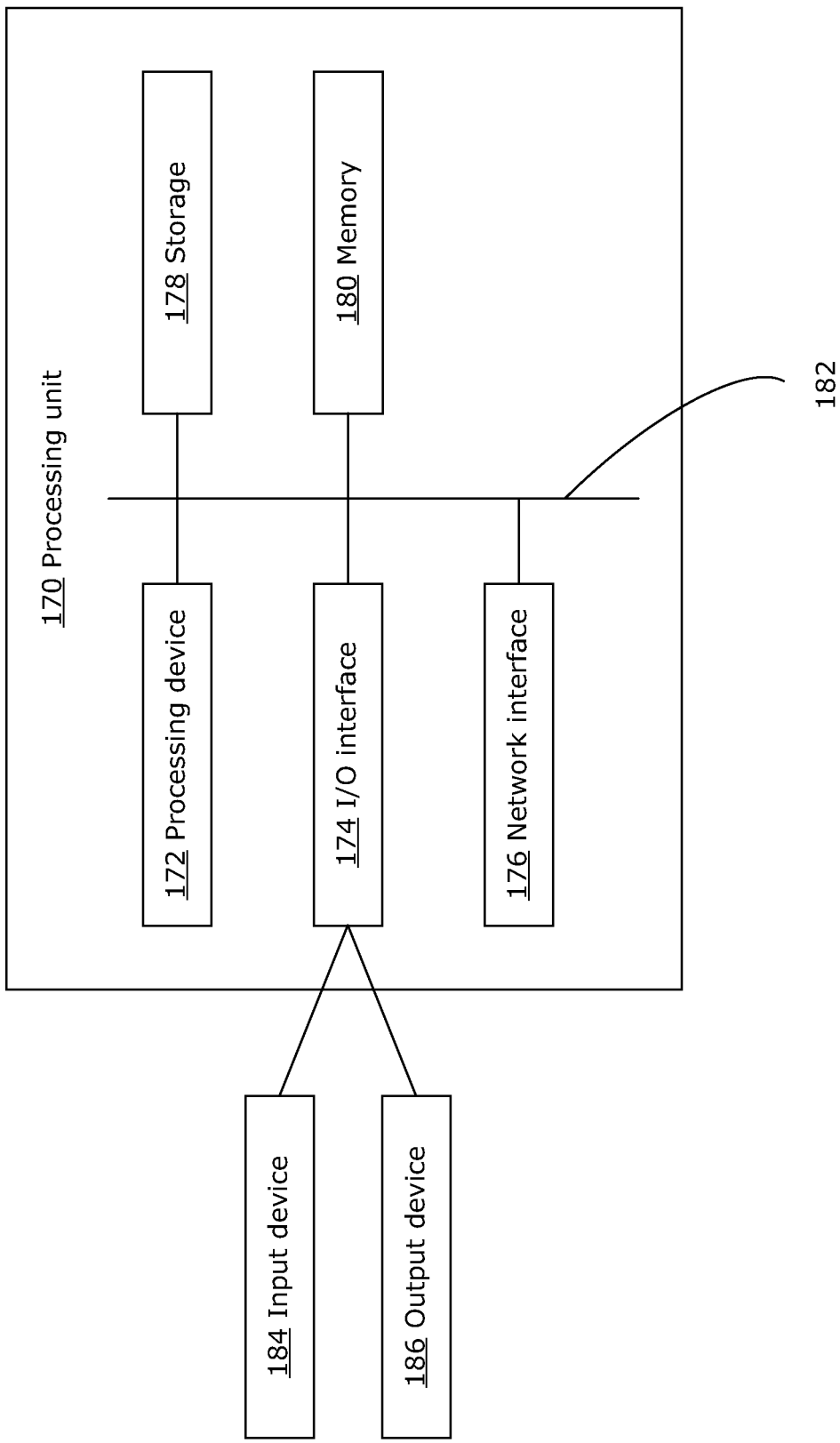
FIG. 13 is a block diagram of a processing unit that can be used to implement modules and units of the system of FIG. 1 according to example embodiments.

FIG. 13 is a block diagram of an example processing unit 170, which may be used to implement one or more of the modules or units of system 100. Processing unit 170 may be used in a computer device to execute machine executable instructions that implement one or more of the modules or parts of the modules of system 100. Other processing units suitable for implementing embodiments described in the present disclosure may be used, which may include components different from those discussed below. Although FIG. 9 shows a single instance of each component, there may be multiple instances of each component in the processing unit 170.

The processing unit 170 may include one or more processing devices 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network (e.g with networks 118 or 132).

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing device(s) 172, such as to carry out examples described in the present disclosure. The memory(ies) 180 may include other software instructions, such as for implementing an operating system and other applications/functions.

There may be a bus 182 providing communication among components of the processing unit 170, including the processing device(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of any publications identified in this disclosure are incorporated herein by reference.

The invention claimed is:

1. A computer implemented method comprising:
    generating a set of normalized images corresponding to a plurality of mass-produced manufactured parts, comprising, for each manufactured part:
        capturing an image of the manufactured part using an image sensing device, wherein an actual pose of the manufactured part relative to the image sensing device in the image can vary from an expected pose of the manufactured part relative to the image sensing device;
        estimating an optimal pose that represents a transformation of the expected pose to the actual pose based on (i) the image, (ii) initial pose data that indicates the expected pose, and (iii) a 3D model that models a model part that corresponds to the manufactured part as a set of polygonal facets;
        mapping texture data from the image to facets of the 3D model based on the optimal pose to generate a textured 3D model corresponding to the optimal pose; rendering a plurality of virtual images for a plurality of different virtual poses of the manufactured part based on the textured 3D model; and
        adding the plurality of virtual images to a dataset to generate the set of normalized images;
    and
    deriving, based on the set of normalized images, a computer implemented function for assigning one or more attributes to future mass-produced manufactured parts based on respective captured images thereof.

2. The method of claim 1 wherein, for each manufactured part, estimating the optimal pose comprises:
    detecting edges of the manufactured part from the image;
    projecting model edges from the 3D model, corresponding to the expected pose;
    determining visible model edges based on the projected model edges;
    mapping the detected edges to the visible model edges;
    determining transform data for transforming coordinates in the image to coordinates in the 3D model based on the mapping of the detected edges to the visible model edges;
    computing the optimal pose based on the transform data.

3. The method of claim 1 comprising, for each manufactured part, classifying visibilities of the facets based on the optimal pose, wherein mapping texture data from the image to facets of the 3D model comprises selectively mapping the texture data to only some of the facets based on the visibility classifications of the facets.

4. The method of claim 3 wherein classifying visibilities of the facets comprises classifying the facets as one of visible, partially visible and non-visible by predicting an extent of visibility of the facets when imaged by an image sensing device at the optimal pose based on the 3D model.

5. The method of claim 4 predicting the extent of visibility of the facets comprises:
    rendering a first virtual image of the model part based on the 3D model, wherein rendered pixels of the first virtual image correspond to portions of the model part that are visible in the first virtual image from a perspective corresponding to the optimal pose;

rendering a second virtual image of the model part wherein all facets of the model part are assumed to be visible;

for each facet, determine the number of corresponding visible pixels in the first virtual image that map to the facet relative to the total number of pixels in the second virtual image that map to the facet, and: (i) when the relative number of visible pixels that map to the facet exceeds a first threshold then classify the facet as "visible"; (ii) when the relative number of visible pixels falls below a second threshold then classify the facet as "non-visible"; (iii) when the relative number of visible pixels falls between the first and second thresholds then classify the facet as "partially visible".

6. The method of claim 3 wherein selectively mapping the texture data to only some of the facets comprises: determining texture coordinates that map respective groups of pixel values from the image to respective facets that have been identified as visible or partially visible.

7. The method of claim 6 comprising adding the texture coordinates to the 3D model to generate the textured 3D model.

8. The method of claim 1 wherein, for each manufactured part, mapping the texture data from the image to the facets of the 3D model comprises determining texture coordinates that map respective groups of pixels from the image to respective facets; and rendering the virtual image for a pose other than the optimal pose comprises managing occlusions of the manufactured part included in the image through rendering-based routines that incorporate shadow-mapping.

9. The method of claim 1 wherein, for each manufactured part, rendering the plurality of virtual images comprises, for each of the plurality of virtual images:

rendering a first virtual depth buffer image for the textured 3D model corresponding to the optimal pose;

rendering a second virtual depth buffer image for the textured 3D part model corresponding to a respective pose from the plurality of different virtual poses; and performing shadow mapping based on a comparison of corresponding pixels of the first virtual depth buffer image and the second virtual depth buffer image, wherein rendering the virtual image is based on the shadow mapping.

10. The method of claim 1 wherein the computer implemented function comprises a classification function that is configured to assign the one or more attributes to future mass-produced manufactured parts based on respective rendered virtual images generated based on the respective captured images thereof.

11. The method of claim 10 wherein the classification function is configured to output a quality prediction for the manufactured part.

12. The method of claim 10 wherein deriving the computer implemented function comprises assigning labels to the set of normalized images and training a machine learning model to perform the classification function using the set of normalized images and the assigned labels.

13. The method of claim 1 comprising:

generating a second set of normalized images corresponding to the plurality of mass-produced manufactured parts, comprising, for each manufactured part:

capturing a second image of the manufactured part using an second image sensing device that captures a different type of texture data than the image sending device;

estimating a second optimal pose that represents a transformation of an expected pose of the manufactured part relative to the second image sensing device to an actual pose of the manufactured part relative to the second image sensing device;

mapping texture data from the second image to facets of the 3D model based on the second optimal pose to generate a second textured 3D model corresponding to the second optimal pose; and rendering a second plurality of virtual images for a second plurality of different virtual poses of the manufactured part based on the second textured 3D model; and adding the second plurality of virtual images to a second dataset to generate the second set of normalized images; and generating a third set of normalized images in which texture data from virtual images of the same manufactured part in the set of normalized images and the second set of normalized images is combined.

14. The method of claim 13 wherein the image sensing device captures visible light texture data and the second image sensing device captures infrared light texture data.

15. A system comprising:

an image sensing device that is positioned with respect to an image capture location in an industrial process;

an image processing module configured to process a respective image of each of a plurality of mass-produced manufactured parts, the respective image of each manufactured part being captured by the image sensing device while the manufactured part is located at the image capture location, wherein an actual pose of the manufactured part relative to the image sensing device in the respective image can vary from an expected pose of the manufactured part relative to the image sensing device;

the image processing module being configured to, in respect of each manufactured part:

estimate an optimal pose that represents a transformation of the expected pose to the actual pose based on (i) the respective image of the manufactured part, (ii) initial pose data that indicates the expected pose, and (iii) a 3D model that models a model part that corresponds to the manufactured part as a set of polygonal facets;

map texture data from the respective image of the manufactured part to facets of the 3D model based on the optimal pose to generate a textured 3D model corresponding to the optimal pose; and render, for the manufactured part, a plurality of virtual images for a plurality of virtual poses of the manufactured part relative to the image sensing device based on the textured 3D model, wherein the image processing module is further configured to assemble, for saving to an electronic storage, the plurality of virtual images rendered for each of the manufactured parts into a set of normalized images corresponding to the plurality of mass-produced manufactured parts.

16. The system of claim 15 further comprising a configuration module that is configured to derive, based on the set of normalized images, a computer implemented function for assigning one or more attributes to future mass-produced manufactured parts based on respective captured images thereof.

17. The system of claim 16 wherein the system includes a plurality of the image processing modules each configured to process respective images captured by respective image sensing devices of each of a plurality of respective mass-produced manufactured parts to generate respective sets of normalized images, the configuration module being configured to derive the computer implemented function based on a plurality of the respective sets of normalized images.

18. The system of claim 15 wherein, for each manufactured part, rendering the plurality of virtual images comprises, for each of the plurality of virtual images:
   rendering a first virtual depth buffer image for the textured 3D model corresponding to the optimal pose;
   rendering a second virtual depth buffer image for the textured 3D part model corresponding to a respective pose from the plurality of different virtual poses; and
   performing shadow mapping based on a comparison of corresponding pixels of the first virtual depth buffer image and the second virtual depth buffer image,
   wherein rendering the virtual image is based on the shadow mapping.

19. A computer readable medium storing a set of non-transitory executable software instructions that, when executed by one or more processing units, configure the one or more processing units to perform the method of:
   generating a set of normalized images corresponding to a plurality of mass-produced manufactured parts, comprising, for each manufactured part:
      capturing an image of the manufactured part using an image sensing device, wherein an actual pose of the manufactured part relative to the image sensing device in the image can vary from an expected pose of the manufactured part relative to the image sensing device;
      estimating an optimal pose that represents a transformation of the expected pose to the actual pose based on (i) the image, (ii) initial pose data that indicates the expected pose, and (iii) a 3D model that models a model part that corresponds to the manufactured part as a set of polygonal facets;
      mapping texture data from the image to facets of the 3D model based on the optimal pose to generate a textured 3D model corresponding to the optimal pose;
      rendering a plurality of virtual images for a plurality of different virtual poses of the manufactured part based on the textured 3D model; and
      adding the plurality of virtual images to a dataset to generate the set of normalized images;
   and
   deriving, based on the set of normalized images, a computer implemented function for assigning one or more attributes to future mass-produced manufactured parts based on respective captured images thereof.

* * * * *